March 6, 1945.  S. YERKOVICH ET AL  2,371,116
PHONOGRAPH
Filed Jan. 15, 1943  9 Sheets-Sheet 1

INVENTORS
Simon Yerkovich
Ralph H. Sherman
George W. Cameron
BY Blair, Curtis & Hayward
ATTORNEYS

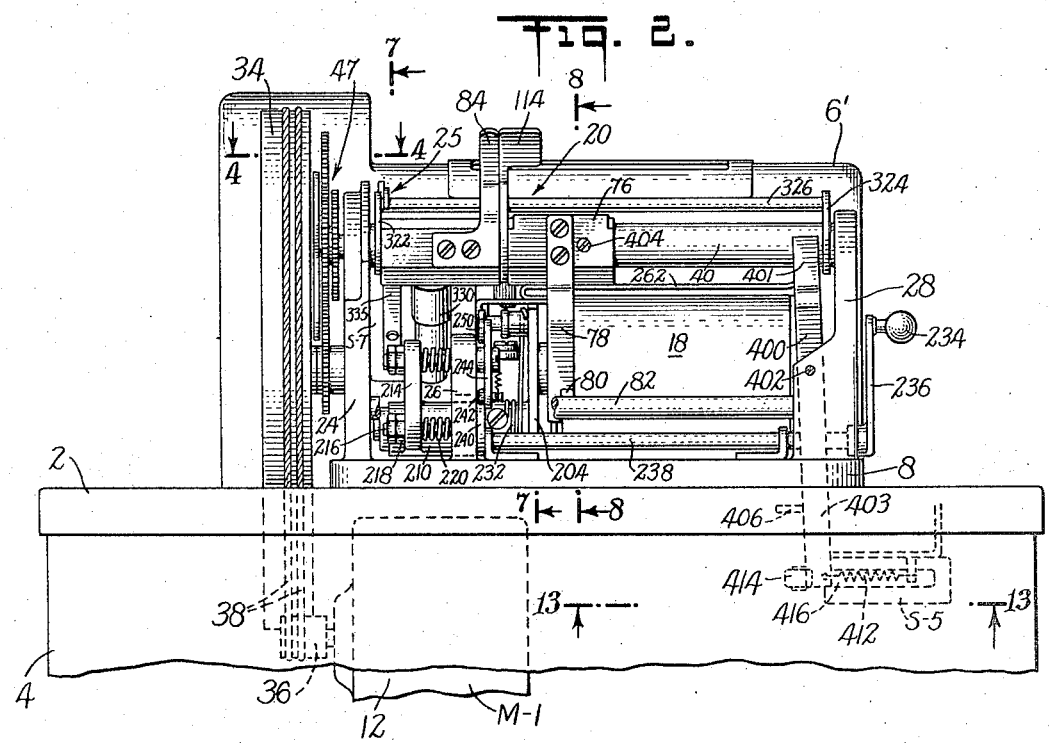
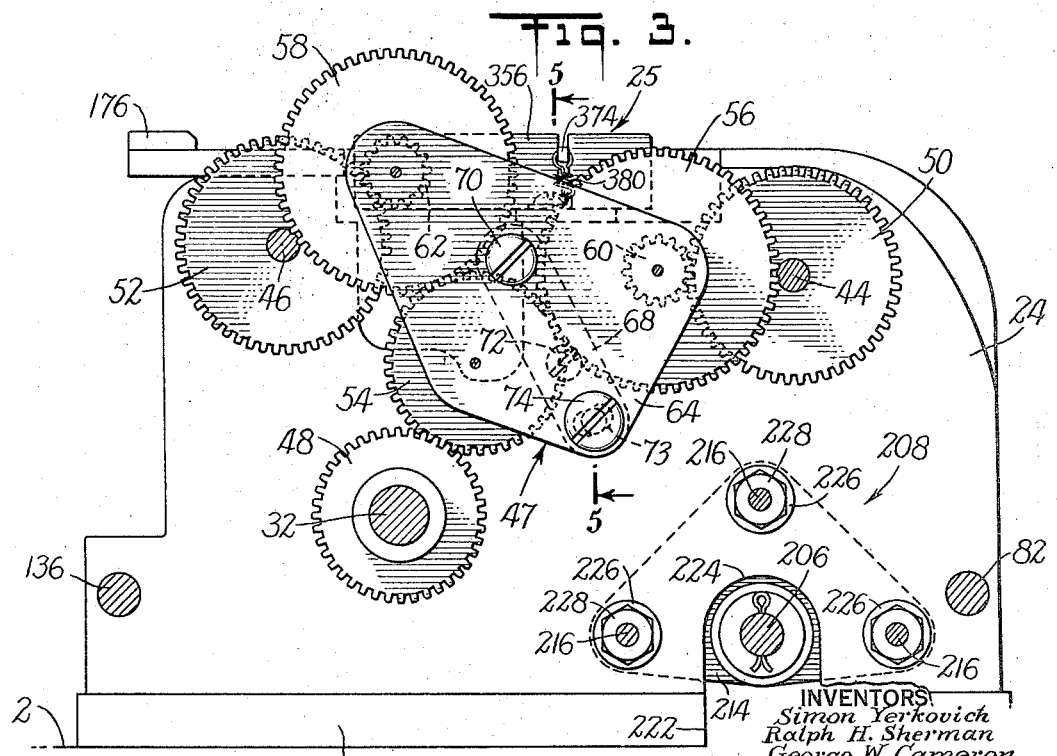

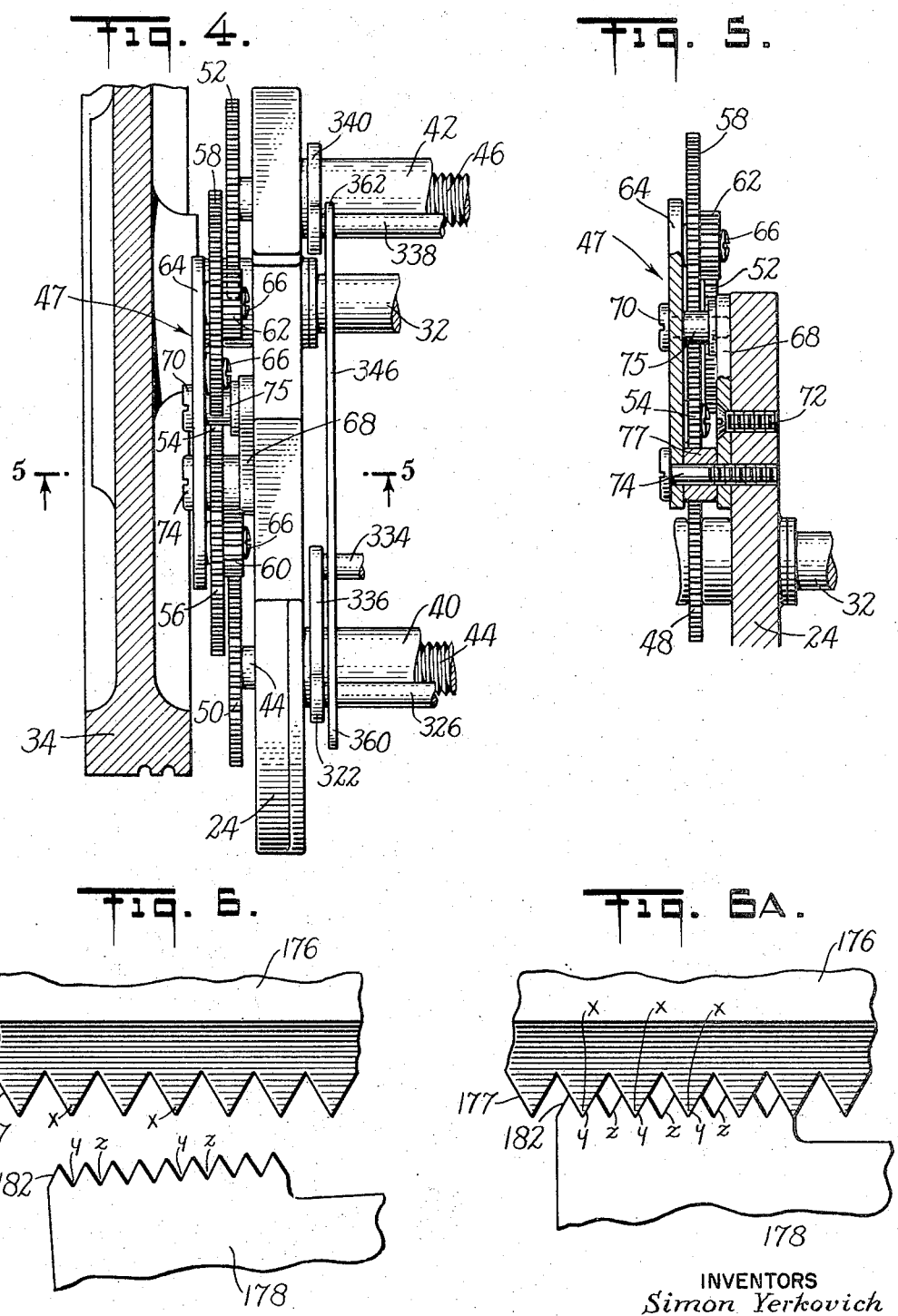

March 6, 1945. S. YERKOVICH ET AL 2,371,116
PHONOGRAPH
Filed Jan. 15, 1943 9 Sheets-Sheet 4
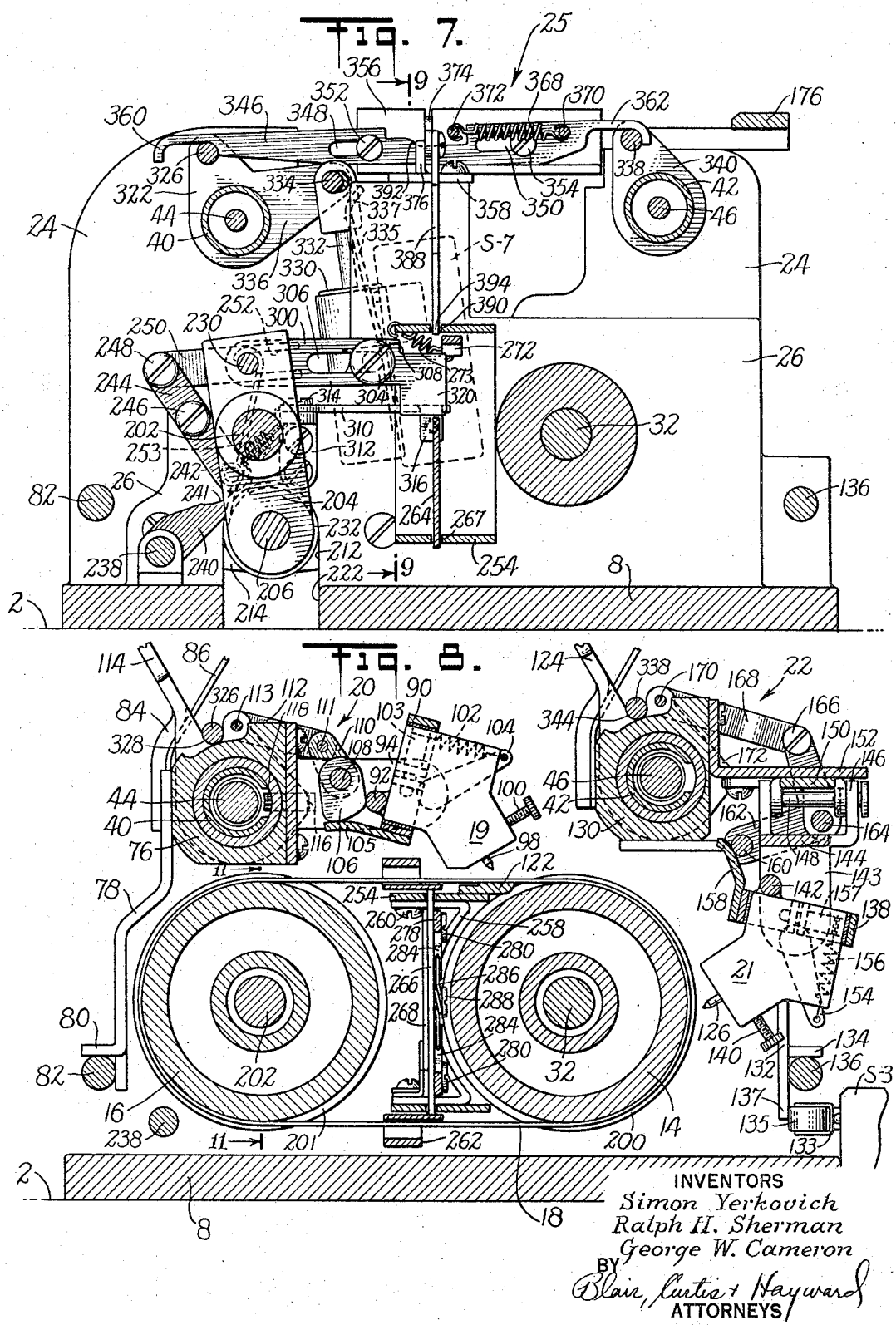
INVENTORS
Simon Yerkovich
Ralph H. Sherman
George W. Cameron
BY Blair, Curtis + Hayward
ATTORNEYS

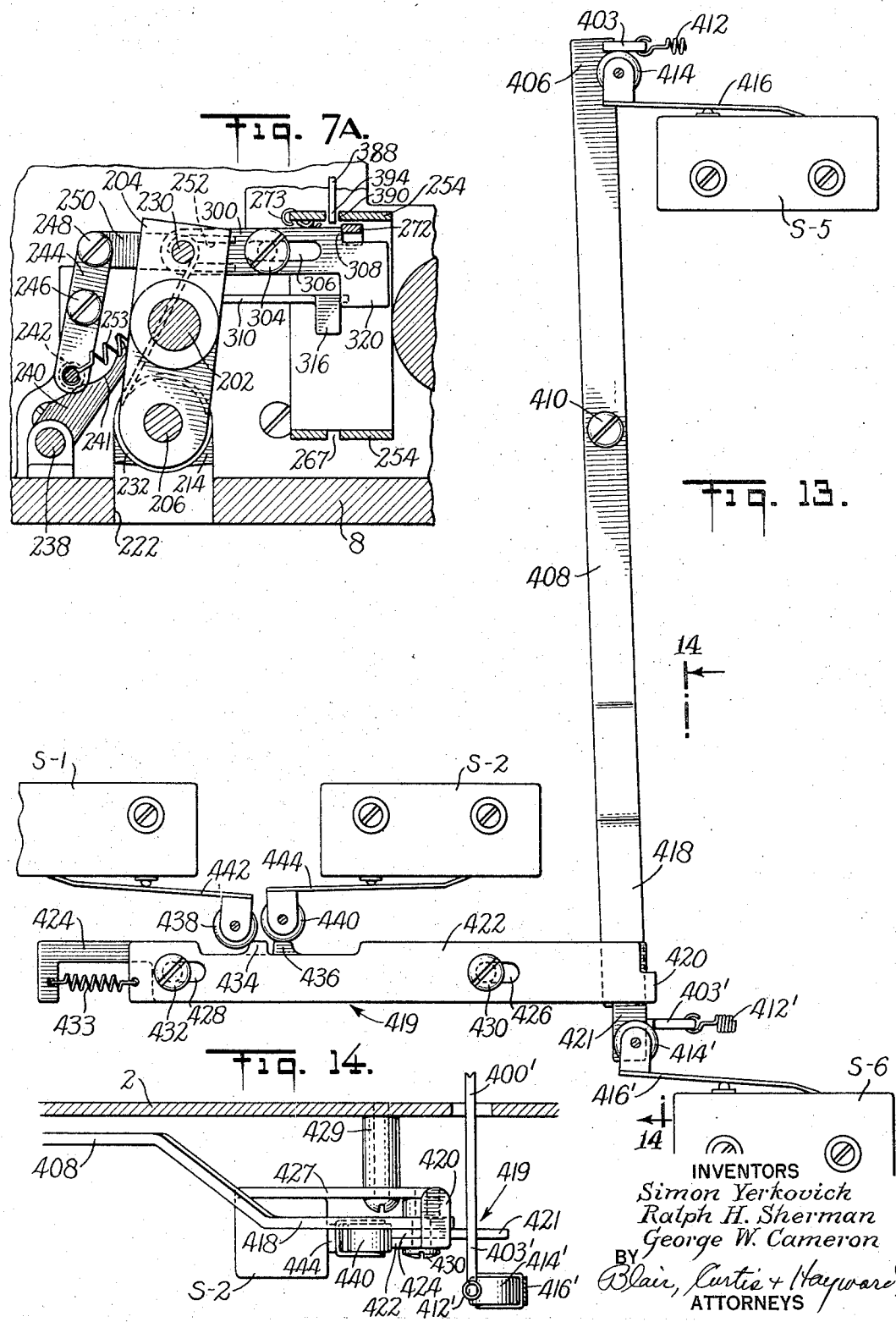

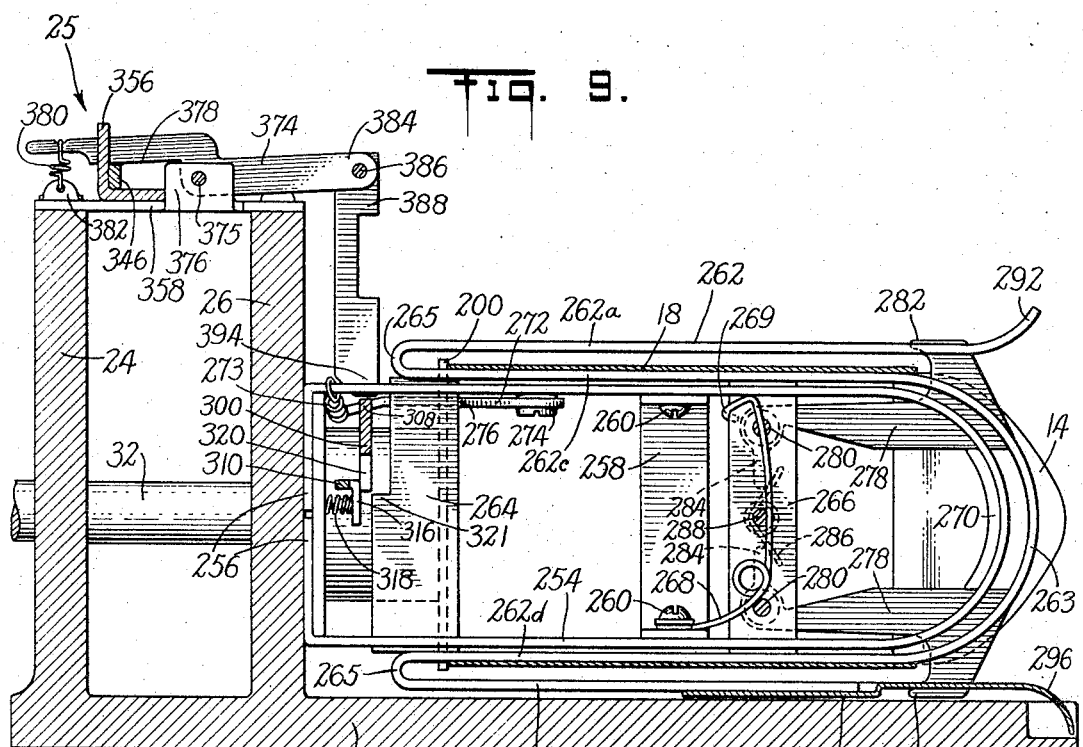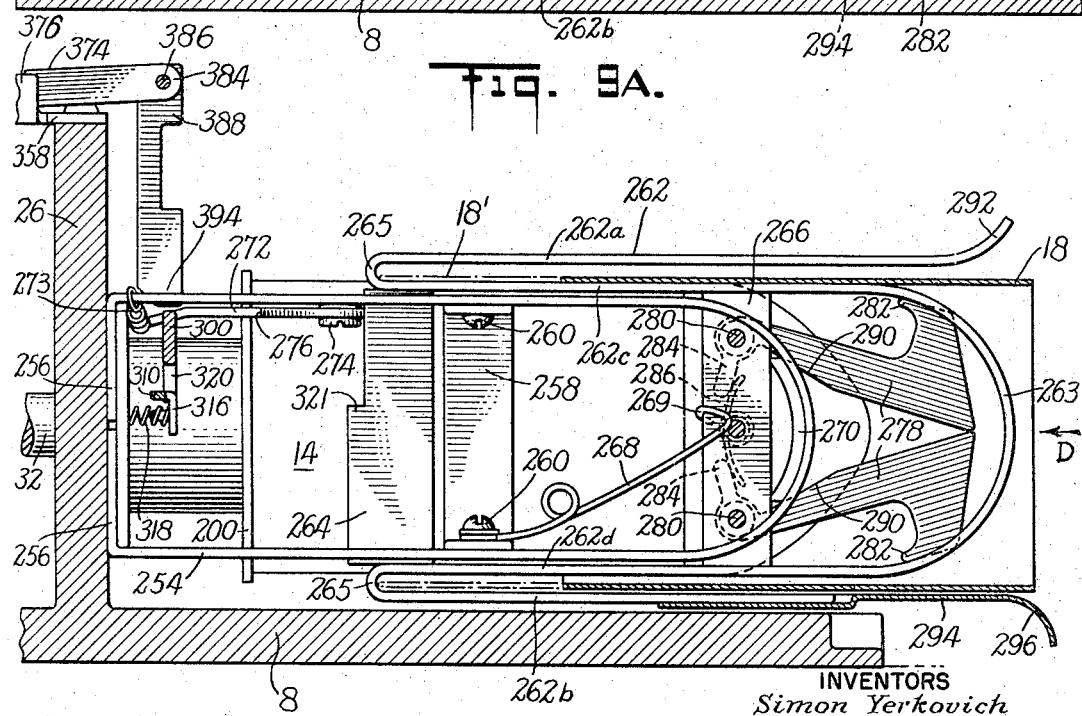

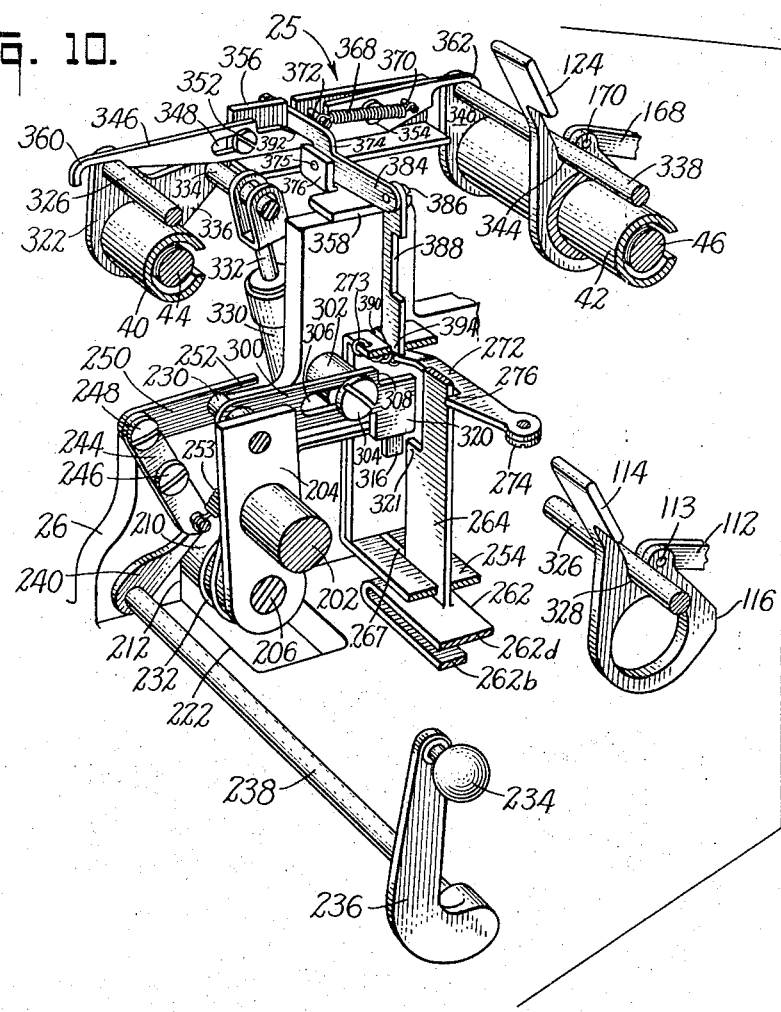
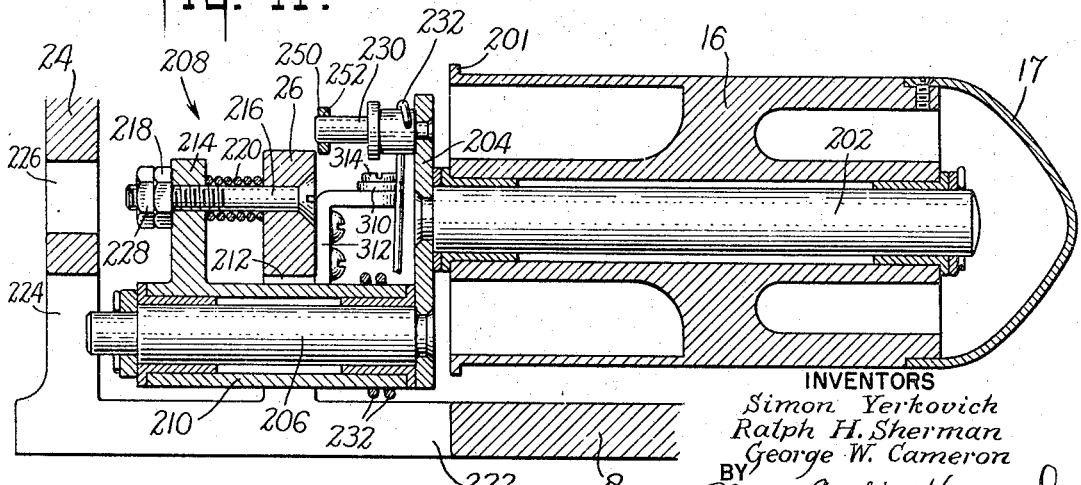

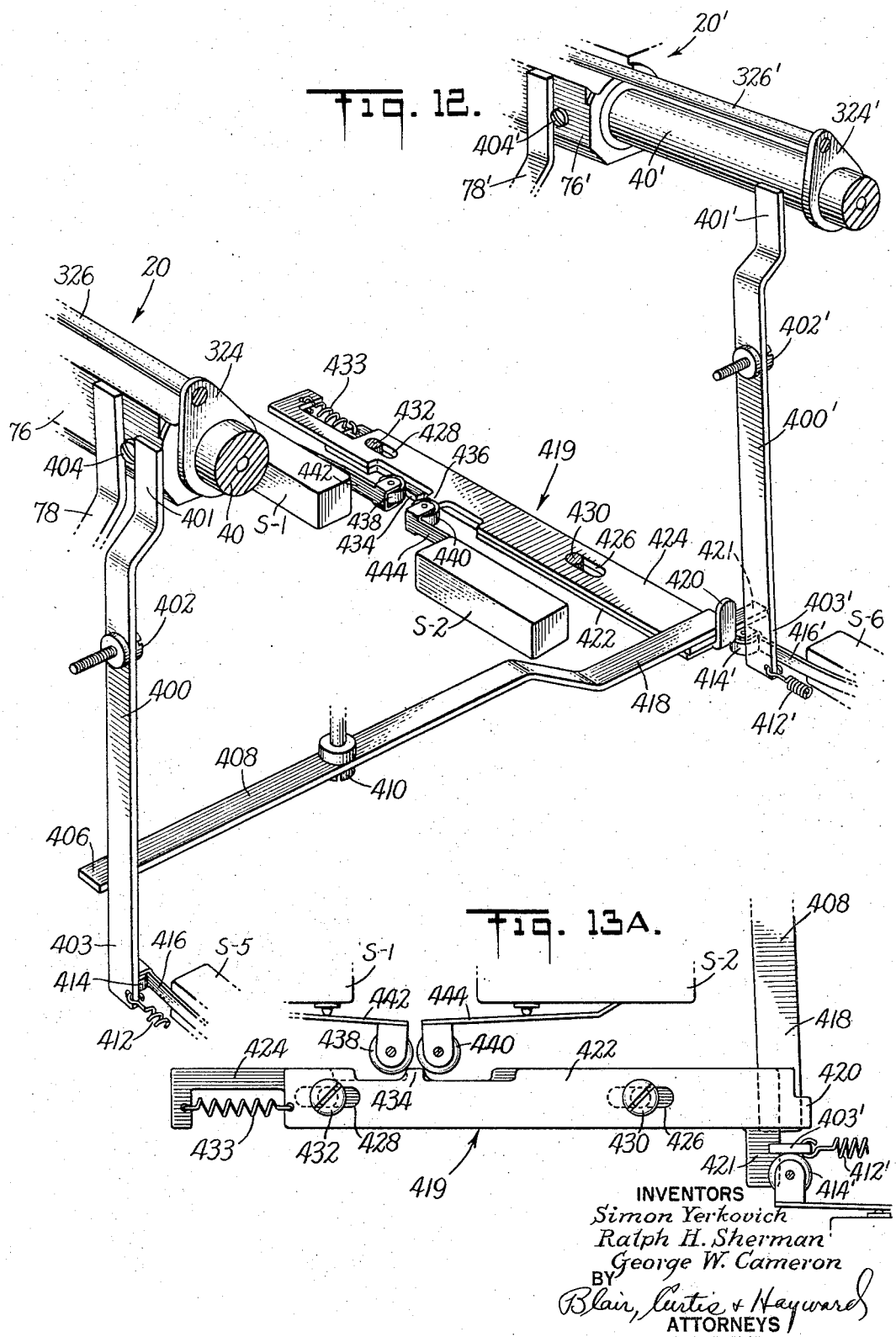

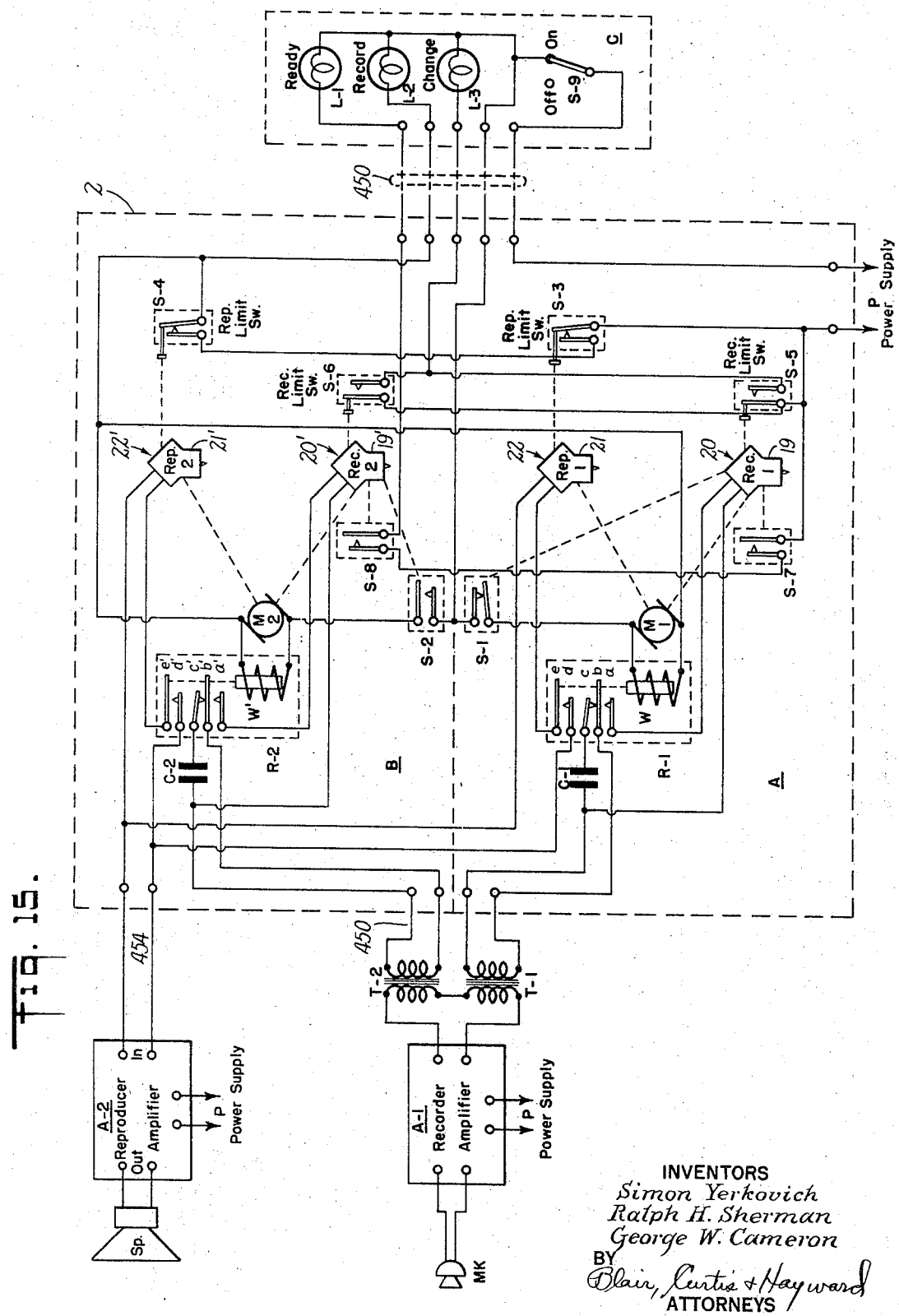

Patented Mar. 6, 1945

2,371,116

UNITED STATES PATENT OFFICE 2,371,116

PHONOGRAPH

Simon Yerkovich, Ralph H. Sherman, and George W. Cameron, Fairfield County, Conn., assignors to Dictaphone Corporation, New York, N. Y., a corporation of New York Application January 15, 1943, Serial No. 472,448

6 Claims. (Cl. 274—11)

This invention relates to phonographs, and more particularly to machines for continuously recording speech and other sounds and for reproducing the same.

Continuous recording of lengthy speeches, telephone conversations, radio broadcasts, airport control orders, and the like, has been accomplished in the past by the use of dual phonograph units of the type shown, for example, in U. S. Patent 2,026,398 to Norton et al., entitled "Twin phonograph."

One of the objects of the present invention is to provide an improved machine of the above nature which is simple, practical, and easy and convenient to operate, and which is rugged and dependable under even the most severe operating conditions.

Continuous recording machines of this type are frequently used for "logging" purposes, i. e., for making a permanent record of all that transpires at some given station for record and future reference purposes. It is desirable for this type of operation that the machine be designed to use an inexpensive, single-use record blank upon which a permanent record may be formed, rather than the wax cylinder type record usually used. It is also desirable that a permanent record blank of this type be of such construction as to permit easy filing for future reference, and be of such size as to occupy a minimum of space when thus filed. A record blank having these advantageous properties for such use is the endless loop or belt record made of cellulosic material of the type designed for use with the improved dictating machine disclosed in copending patent application Serial No. 366,849, now Patent No. 2,318,828, granted May 11, 1943, entitled "Phonograph."

Accordingly, therefore, it is another object of the invention to provide an improved machine of this nature adapted to utilize a belt record for continuous recording.

It is a further object of this invention to provide a machine capable of making a record on a flexible loop record blank at extremely low linear speeds so as to permit many minutes of recording to be placed on each blank, thus greatly reducing the number of them required in any given period of time and the frequency of record replacement.

Other objects of the invention will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

The invention may be more readily understood by reference to the accompanying drawings, showing one of the various possible embodiments of this invention, in which Figure 1 is a top plan view of a twin phonograph embodying the present invention, with the cover of one of the dual units A and B removed to disclose a portion of operating mechanism;

Figure 2 is a front elevation thereof showing a portion of the supporting base;

Figure 3 is an enlarged vertical section of phonograph unit A taken substantially on line 3—3 of Figure 1;

Figure 4 is an enlarged fragmentary horizontal section taken substantially on line 4—4 of Figure 2;

Figure 5 is a fragmentary vertical section taken substantially on line 5—5 of Figure 4;

Figure 6 is a magnified fragmentary view of the ratcheting portion of the reproducer backspacer mechanism, showing the teeth thereof in disengaged position;

Figure 6a is a view similar to Figure 6 but showing the teeth of the ratcheting portions thereof in engaged position;

Figure 7 is an enlarged vertical section of phonograph unit A taken substantially on lines 7—7 of Figures 1 and 2 showing the parts in normal operating positions;

Figure 7a is a fragmentary vertical section similar to a portion of Figure 7 but showing the position of certain of the parts thereof after the record ejector mechanism has been operated;

Figure 8 is a similar enlarged vertical section taken substantially on lines 8—8 of Figures 1 and 2;

Figure 9 is a vertical section of unit A taken substantially on line 9—9 of Figure 7 showing the loop record ejector mechanism in the position it occupies when a record is mounted in the machine in operating position;

Figure 9a is a view similar to Figure 9 but showing the loop record ejector mechanism in the position it assumes after a record has been ejected from the machine;

Figure 10 is a skeletonized perspective view of the record ejector operating mechanism and the interlocking connections between the record ejector mechanism and the recorder and reproducer conditioning levers;

Figure 11 is a vertical section of the record loop supporting idler drum or mandrel taken substantially on line 11—11 of Figure 8, showing details of its supporting structure;

Figure 12 is a skeletonized perspective view of the control mechanism for automatically operating the two phonograph units of the machine in sequence;

Figure 13 is a bottom plan view of a portion of the mechanism shown in Figure 12 taken in the direction of arrows 13—13 in Figure 2;

Figure 13a is a fragmentary bottom plan view similar to a portion of Figure 13 but showing certain of the parts thereof in the positions they assume during a different portion of the cycle of operation of this mechanism;

Figure 14 is a vertical section taken substantially on line 14—14 of Figure 13; and Figure 15 is a wiring diagram showing schematically certain mechanisms and devices for remotely controlling a machine constructed in accordance with the present invention.

Similar reference characters refer to similar parts throughout the different views of the drawings, and similar portions of machines A and B are indicated by the same reference characters except that those on machine B are primed.

Figure 1:
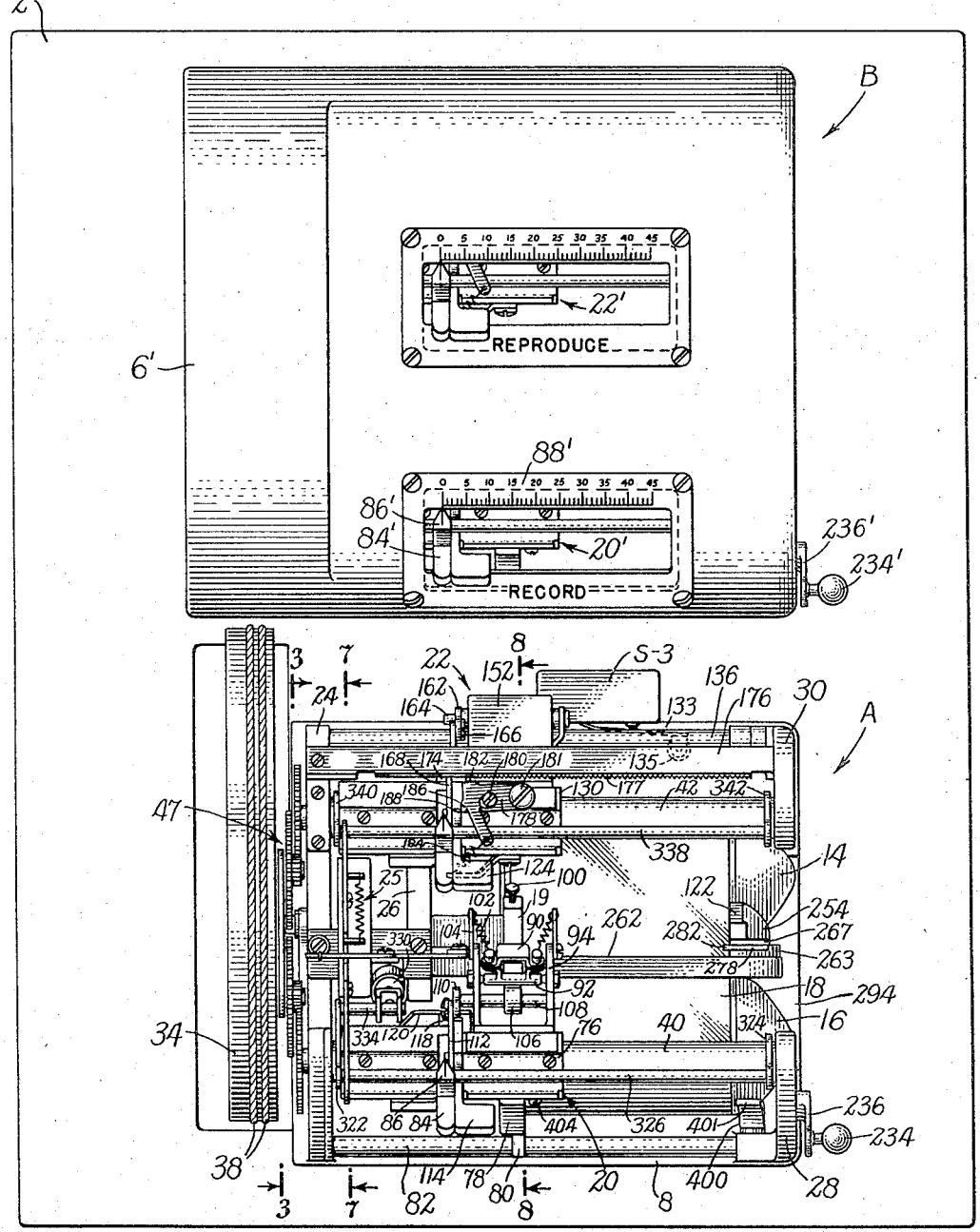

Before describing the present invention in detail it may be well to give consideration to certain of the more general aspects of twin phonograph operation and control. One of the principal uses of this type of machine is to record continuously, matter of such length that it cannot be recorded on a single record blank. Accordingly, two duplicate phonograph units are employed, each having a suitably driven record blank support, and a carriage movably mounted to traverse a recorder unit across the record blank to impress a sound record groove thereon. A suitable mechanism is employed to cause alternate operation of the two units in such manner that when the record blank in one is nearly exhausted, the other is automatically put in operation to commence recording on a second record blank on the second unit. The first machine unit is then stopped, the first record blank removed, and a third record blank substituted therefor. This alternate operation of the two machine units and substitution of fresh record blanks, may be continued until the end of the speech or message; or carried on indefinitely if it is desired continuously to "log" all transactions at a given point.

The present invention provides a novel arrangement of electrical and mechanical elements in a dual phonograph machine which operates automatically to provide such automatic sequential operation for continuous recording purposes. It also provides an improved record supporting, driving, and handling arrangement which permits the use of a novel type of flexible endless loop record blank on which it is possible to record considerably more material than can be put on the usual wax cylinder record tablets previously used in such machines. Furthermore, the machine is arranged to permit reproduction while the machine is recording, and even to permit simultaneous playback of the matter being recorded.

Referring to Figures 1 and 2 of the drawings, the twin phonograph, chosen to illustrate the present invention, comprises a sub-base 2 hinged or otherwise mounted on a support 4. A pair of identical recording and reproducing machines which are herein referred to as units A and B, respectively, are suitably secured side by side to the sub-base 2. These two units A and B are interconnected and interlocked by automatic change-over mechanism for effecting sequential operation, as will hereinafter be described in connection with Figures 12, 13, 13a and 14.

In the following description, it should be understood that the details described with reference to one of these units A or B are exactly duplicated in the second unit and, therefore, that the following description of one unit applies in every way to the other unit, except for the description of certain particular mechanical and electrical connections relating to the automatic change-over mechanism. In Figures 1 and 2, phonograph unit A is shown with its cover removed so as more clearly to show its internal structure. Normally the unit is provided with a cover similar to cover 6' on unit B.

In general, each of the phonograph units A and B essentially comprises a driving motor M which, through suitable driving mechanism hereinafter to be described, drives one of a pair of parallel horizontal drums or mandrels 14 and 16 which tautly support a flexible endless loop record blank 18 and drive it past a recorder unit 19 mounted on a carriage, generally indicated at 20, and a reproducer unit 21 mounted on a carriage, generally indicated at 22, which units may be independently and selectively traversed across the length of the record blank 18 by means of a pair of feed screws 44 and 46 (see Figures 3, 7 and 8), to impress on the record a helical sound groove while making a record, and to follow such a helical sound groove in reproducing a record.

Record supporting structure

Referring to Figures 1 and 2, phonograph unit A is mounted on a horizontal base plate 8 (best seen in Figure 2) suitably secured to the sub-base 2. A pair of parallel vertical frame members 24 and 26 project upwardly from base plate 8 near and parallel to its left-hand end, as may be more plainly seen in Figure 9, and two other parallel vertical frame members 28 and 30 project upwardly from the right-hand corners of base plate 8, as shown in Figure 1. These frame members 24, 26, 28 and 30 form the principal supports for most of the operating mechanism of the phonograph. The driven mandrel 14 is secured to a drive shaft 32 suitably rotatively supported in bearings carried by left-hand frame members 24 and 26 (see Figures 3 and 9). A combination fly-wheel and driving pulley 34 is secured to the other end of the drive shaft 32. Pulley 34 is connected to a driving pulley 36 on the shaft of driving motor M—1 by means of an endless-cord type belt 38 provided with a suitable crossover arrangement and tightening idler such, for example, as that shown in the above-mentioned copending application Serial No. 366,849. This pulley drive arrangement is so proportioned, taking into consideration the speed of motor 12, as to impart a very low peripheral speed to the driving drum 14, for example, a speed of approximately fifteen feet per minute, which makes possible putting about forty-five minutes of recording on a single loop record of approximately twelve inches in circumference and three and one-half inches in length. Thus, with a dual machine employing records of these dimensions, driven at this speed, it is possible to make one hour and a half of continuous recording without replacing a record.

A novel rockable structure is provided to rotatively support the idler mandrel 16 so that it may be moved toward the driving mandrel 14, decreasing the tension on the record loop 18 to permit ejection of the latter from the machine; and may be moved away from the driving mandrel 14 to maintain the record loop 18 in taut condition for receiving a sound record. Further, this supporting structure is arranged to bias the idler mandrel 16 to a position to cause the record loop 18 to tend to move toward the flanges 200 and 201 of mandrels 14 and 16, respectively (see Figures 8 and 9), so as to insure perfect tracking of the recorder and reproducer styli over the surface of the record 18.

Referring to Figures 7, 10 and 11, idler mandrel 16 is rotatably mounted on a shaft 202 which is secured to and extends from the middle of a lever 204, one end of which is secured to another shaft 206, rotatably mounted in a suspended bearing member, generally indicated at 208 (Figure 11). Thus mandrel shaft 202, lever 204, and shaft 206 form a crank-like arrangement rockable about the axis of shaft 206. Referring to Figure 11, bearing member 208 is formed of a tubular bearing portion 210 surrounding shaft 206 and with its righthand end projecting through a hole 212 in vertical frame member 26 and provided at its lefthand end with a triangular flange portion 214 (see Figure 3). This flange portion 214 is yieldably attached to vertical frame member 26 by means of three bolts 216 passing through frame member 26 and through holes at the corners of flange 214, where they are secured by nuts 218, compression springs 220 being interposed between flange 214 and frame member 26, as can be most readily seen in Figure 11. By suitable adjustment of nuts 218 the position of flange 214 with respect to vertical frame member 26 may be determined and, thus, the position of idler mandrel shaft 202 with respect to driving mandrel shaft 32. Nuts 228 are provided to lock nuts 218 in position once this adjustment has been made. Normally this structure is adjusted so as to position shaft 202, and therefore idler mandrel 16, slightly out of parallelism with driving shaft 32, and driving mandrel 14, so as to render the distance between the axes of these shafts slightly greater at one end than at the other. This makes the tension on one edge of the belt or loop slightly greater than that at its other edge, so that the loop record tends to crawl until its edge strikes and is arrested by the flanges 200 and 201 of the mandrels. With this arrangement the loop records always seat in the same position on the mandrels 14 and 16 thus always insuring correct tracking of the styli in respect to the record surface. Further, the compression springs 220 provide a yielding mounting for the idler mandrel 16 whereby suitable tension is always maintained across the entire length of the loop record in spite of possible eccentricities in the cylindrical configuration of the mandrels.

In order to permit complete freedom of movement of the bearing member 208, base plate 8 is provided with a cutout portion 222 immediately beneath the bearing member 208 and vertical frame member 24 is provided with a cutout portion 224 opposite the end of shaft 206. A cutout portion 226 is also provided in vertical frame member 24 opposite nuts 218 so that these nuts may be adjusted easily when desired. The upper or free end of lever 204 is provided with a thrust pin 230 arranged to be moved toward the back of the machine, as will hereinafter be described in connection with the discussion of the record mounting and dismounting or ejecting mechanism, to move lever 204 and therefore idler mandrel 16 toward drive mandrel 14 against the force of a bias spring 232. Such movement, reducing the distance between the axes of the mandrels, releases a loop record supported thereon so that the record may be ejected and removed from the machine. The bias spring 232 is a strong spiral spring which, anchored at one end to the thrust pin 230 on lever 204, makes several turns around the outside of the tubular portion 210 of the idler shaft bearing 208, and is anchored at its other end to the vertical frame member 26 (see Figure 2). Thus the rockable support of the idler mandrel 16 is biased in a counter-clockwise direction, as shown in Figure 7, and so provides constant tension on the loop record mounted thereon. This constant tension keeps the record taut at all times.

*Recorder and reproducer mountings and drives*

Recorder carriage 20 and reproducer carriage 22 are each slidably mounted for traversing movement across the record 18 substantially parallel to the axis of the driving cylinder 14 on guide rods 40 and 42, respectively. Guide rod 40 extends from vertical frame member 24 at the left end of the machine to vertical frame member 28 at the right end thereof, and guide rod 42 extends from frame member 24 to frame member 30, as shown in Figure 1. These guide rods 40 and 42 are tubular and within them feed screws 44 and 46 are rotatably supported. Suitable slots along the side of each of the guide bars provide access in well known manner to the feed screws 44 and 46.

Feed screws 44 and 46 are driven by a novel gear train assembly from drive shaft 32. Referring to Figure 3, a driving gear 48 is mounted on drive shaft 32, and driven gears 50 and 52 are mounted, respectively, on the ends of the feed screw shafts 44 and 46. A novel gear train coupling arrangement, generally indicated at 47, is provided to drive the gears 50 and 52 from gear 48. This gear train coupling 47 is designed and constructed so that it may be attached to the machine frame member 24, in an assembly line on a quantity production basis, without delicate manipulation and yet insure that all of the gears in the train will match perfectly without need of fine machine work or delicate and fussy adjustment. Referring to Figures 3, 4 and 5, this is accomplished by the provision of a gear mounting plate 64 to which three gears 54, 56 and 58 are rotatively secured by means of shoulder screws 66, gear 54 meshing with gears 56 and 58 to drive them in unison. Because the mounting plate 64 is flat, it can be accurately drilled in a jig to position the gears 54, 56 and 58 so they may be assembled easily and still mesh precisely. Two pinions 60 and 62 are secured, respectively, to gears 56 and 58 on the inner face thereof, as shown in Figure 4. The gear mounting plate 64 is secured to a lever 68 by means of a screw 70, and the lever 68, in turn, is adjustably secured to the end frame member 24 by means of a screw 72 threaded into the frame member 24, as shown in Figure 5. The gear mounting plate 64 is also secured to the end frame member 24 by means of another screw 74 which passes through slots in mounting plate 64 and lever 68 into threaded engagement with the frame member 24. The slot in the plate 64 is shown at 73 in Figure 3. Mounting plate 64 is held in parallel spaced relationship to lever 68 and therefore to vertical frame member 24 by means of two spacing collars 75 and 77 surrounding screws 70 and 74, respectively, and interposed between plate 64 and lever 68 as shown in Figure 5.

With this novel arrangement, the assembly of the gear train on the machine is accomplished simply and easily, in the following manner. Lever 68 is first attached to vertical frame member 24 by means of screw 72, which is temporarily tightened. The gear mounting plate 64 supporting gears 54, 56 and 58, and pinions 60 and 62, is then secured respectively to the lever 68 and to the vertical frame member 24 by screws 70 and 74 which are sufficiently tightened fixedly to hold the parts of the assembly until final adjustment is made by tapping them gently into correct position. When this is done the gear mounting plate assembly 64 and lever 68 are first rotated together about screw 72 until gear 54 meshes correctly with gear 48 on driving shaft 32. Thereafter the mounting plate 64 is rotated relatively to the lever 68, about screw 70 in the proper direction correctly to engage pinions 60 and 62 with the feed screw gears 50 and 52, respectively, at the same time maintaining the gear 54 in proper mesh with the gear 48. When all of the gears are correctly positioned, the mounting plate 64 is removed by removing screws 70 and 74 and screw 72 is tightened securely to fasten lever 68 in its adjusted position. Gear mounting plate 64 and screws 70 and 74 are then replaced with the several gears and pinions in proper engagement and the screws 70 and 74 are securely fastened to hold gear mounting plate 64 in this position. After these few simple adjustments have thus been made, the entire gear train from drive shaft 32 to feed screws 44 and 46 is properly meshed, without need for individual fitting and adjustment of the several parts of the train. The size of the several gears 48 through 62 is suitably chosen with respect to the speed of the driving motor 12 and the desired speed of rotation of the driven record mandrel 14 and the pitch of the feed screws 44 and 46, so that the carriages 20 and 22 are traversed at proper speed with respect to the desired linear speed of record 18.

The feed screws 44 and 46, respectively, traverse the recorder head 20 and the reproducer head 22 across loop record 18. Referring to Figures 1, 2, 8 and 10, recorder carriage 20 comprises a body block 76 slidably mounted on guide rod 40 for supporting the recorder 19. Block 76 is prevented from rotating around the guide rod 40 by means of a guide member 78 projecting downwardly therefrom and provided with a right angle guide portion 80 bearing against a second guide rod 82, extending between vertical frame members 26 and 28. Carriage block 76 is also provided with a handle bracket 84 extending forwardly and upwardly therefrom to facilitate moving the carriage by hand to any traverse position desired. A pointer 86 movable with the carriage over a scale mounted on the cover, see 88' unit B, serves to indicate the carriage position along its path of travel. The recorder carriage 20 supports the recorder unit 19, which may be of any suitable type.

In the machine herein described, the recorder unit is a piezo-electric crystal translating device. This recorder unit 19 is clamped in a frame 90 which is pivotally supported as at 92 within a U-shaped bracket 94 secured to the side of the carriage body 76, as shown in Figure 1. A recording stylus 98 is secured to the recorder 19 by means of a thumb screw 100. Two tension springs 102 connect arms 104 projecting from the ends of the U-shaped bracket 94 to pins 103 projecting upwardly from the recorder clamping frame 90 to bias the recording stylus 98 toward the record 18, as shown in Figure 8. The recorder unit clamping frame 90 is also provided with a rearwardly projecting cam-follower 105 which coacts with a cam 106 secured to a shaft 108 suitably rotatively mounted between the arms of the bracket 84. A lever 110 is secured to and projects upwardly from one end of the shaft 108. The free end of this lever is pivotally connected at 111 to a link 112, pivotally attached at 113 to a recorder conditioning lever 114, which is rotatably mounted in a cut-away portion of the carriage body 76, formed concentrically with respect to the guide rod 40. This rotatable mounting of the recorder conditioning lever 114 permits it to be moved from "neutral" position, where it is aligned with the handle 84, to "record" position, in which it extends vertically upward from the carriage 20. As can be most easily seen in Figure 8, when the recorder-conditioning lever 114 is in its "neutral" position parallel to handle 84, the cam-follower 105 on the recorder clamping frame 90 rides up on the high point of cam 106 thus depressing the cam-follower 105 rotating the recording unit 19 about its pivotal axis 92 against the force of springs 102, to lift the stylus 98 from the record 18. When the stylus conditioning lever is moved to its upper or "record" position, the connecting link 112 is moved to the right, thus rotating lever 110 clockwise about its axis 108 to cause cam 106 also to rotate clockwise and permit the cam-follower 105 to slide to the low point on cam 106, so that recorder unit 19 is rotated in a clockwise direction around its axis 92, by springs 102, to move the stylus 98 into contact with record 18.

The recorder conditioning lever 114 is provided with a cam surface 116 on its right-hand edge as seen in Figure 8, which cam surface coacts with a follower surface on a feed nut 118 (see Figure 1) which latter slides in the above mentioned slot in guide rod 40 and is normally held in contact with the feed screw 44 by means of a leaf spring 120, attached to the carriage body member 76. When recorder conditioning lever 114 is in its "neutral" position parallel to handle 84, cam surface 116 lifts the feed nut 118 from contact with the feed screw 44 thus stopping the traverse of carriage 20 across record 18. When the recorder conditioning lever 114 is moved to its vertical or "record" position the cam surface 116 permits the feed nut 118 to drop into contact with the feed screw 44 under the force of spring 120. This connects the recorder carriage 20 to the feed screw 44 and thus causes it to be traversed across record 18.

Referring to Figures 1 and 8, an anvil 122, supported upon a bracket 254 (hereinafter described), is positioned beneath the upper run of the belt record 18, lying parallel to the path of travel of the stylus 98 during the traversing movement of the carriage 20 across record 18. This forms a support for the record 18 enabling the stylus 98 to make a sound groove thereon.

The reproducer carriage structure 22 is essentially the same as that of the recorder carriage structure 20 except that it is provided with a backspacing mechanism, and the reproducer unit 21 has compliance in two directions instead of only one direction as in the case of the recorder 19. Further, the reproducer stylus 126 rides on the record 18 along a path in which the record is in firm contact with the driving mandrel 14. Thus the driving mandrel serves as a support for the record 18, rendering unnecessary an anvil like that provided for the recorder stylus 98. Reproducer carriage 22 comprises a carriage body portion 130 surrounding guide rod 42 and arranged slidably to be positioned therealong. A right angle bracket 132 is secured to carriage body portion 130 and provided with a right angle guide member 134 at its lower end which slides along a second guide rod 136 extending between vertical frame members 24 and 30, parallel to guide rod 42. A reproducer or pickup unit 21 which may be a piezo-electric crystal translating unit similar to the recorder unit 19, and which is provided with a reproducing stylus 126 fastened thereto by means of a set screw 140, is clamped in a frame 138, pivotally mounted at 142 between the two depending arms 143 of a bracket 144. The bracket 144 is provided with two arms 146 projecting upwardly in the opposite direction from the side arms 143. A pivot shaft 148 passes through the arms 146 and through the arms of another U-shaped bracket 150 which is secured to the bottom of a right-angle bracket 152, attached in turn to the carriage body 130, as shown in Figure 8. With this arrangement the pivotal mounting 142 permits the reproducer 21 to move toward and away from the record 18, and the pivotal mounting 148 permits it a lateral motion with respect to record 18. As in the recorder carriage structure, the arms 143, bracket 144 are provided with projections 154 which are connected by tension springs 156 to pins 157 on the reproducer clamping frame 138 to bias the reproducer 21 toward the record 18.

The reproducer frame member 138 is provided with a flat, upwardly projecting tongue 158 which is adapted to engage a pin 160 projecting perpendicular to the end of a bell crank lever 162 pivoted on a shaft 164 on the bracket 150, as shown in Figure 8. The other end of the bell crank lever 162 is pivotally connected at 166 to a link 168 which in turn is pivotally connected at 170 to a reproducer conditioning lever 124.

The reproducer lever 124 is rotatively mounted on the reproducer carriage body 130 in a manner similar to that in which recorder conditioning lever 114 is mounted on recorder carriage body 76. With this arrangement, when the reproducer conditioning lever 124 is moved to a "neutral" position as shown in Figure 8, a bell crank lever 162 is rotated in a counterclockwise direction to move the pin 160 into contact with the flat projecting tongue 158 on the reproducer clamping frame 138. The projecting tongue 158 actuated by the pin 160 acts as a cam to lift the reproducer unit 21 and move it away from record 18. At the same time, because the contacting surfaces of the pin 160 and the tongue 158 are flat, the reproducer 21 is prevented from moving in a lateral direction about the pivot shaft 148. This holds the reproducer 21 in a central or "neutral" position when the carriage is moved manually along the guide rod 42 by means of handle 141. As in the case of the recorder carriage 20 and the recorder conditioning lever 114, the reproducer conditioning lever 124 is provided with a cam surface 172 which (in a well known manner) lifts a feed nut 174 from the feed screw 46 when the lever 124 is in "neutral" position, and which lowers the feed nut 174 onto the feed screw 46 through the slot in guide rod 42 when the lever 124 is moved to "reproduce" position after the reproducer carriage 22 has been moved to the point on the record at which it is desired to reproduce the recording previously made thereon.

The reproducer carriage is also provided with a backspacer arrangement which operates to backspace the carriage a predetermined amount each time the reproducer lever 124 is moved from "neutral" to "reproduce" position. Referring to Figures 1, 6 and 6a, this is accomplished by the provision of a backspace bar 176 mounted between the frame members 24 and 30 parallel to the carriage guide rod 42 and adjacent the top of the reproducer carriage body portion 130 and provided with a toothed ratchet edge 177. A pawl member 178 is slidably mounted on a horizontal surface on the top of the carriage body 130 by means of two shoulder screws 180 and 181 passing through slots in the pawl member, shown in Figure 1. One end of the pawl member 178 is provided with a series of teeth 182 adapted to coact with the ratchet teeth 177 on the backspace bar 176. This pawl member is normally held away from the rack 176 by a spring 184 which tends to pivot the pawl member 178 in a counterclockwise direction, as shown in Figure 1, about screw 181. At the end of the pawl member 178 adjacent its toothed edge 182, a small cam-like projection 186 is provided. When the reproducer conditioning lever 124 is moved from its "neutral" to its "reproduce" position, a cam portion 188 on one side thereof encounters the cam portion 186 of the pawl member 178. The initial movement of the cam portion 188 moves the pawl member 178 toward the backspace bar 176 until the teeth 182 contact the toothed edge 177 and mesh therewith, as shown in Figure 6a. As the motion of reproducer conditioning lever 124 is continued toward its "reproduce" position, the cam surface 188 rides up on the cam surface 186 of pawl member 178 and, because the pawl member 178 is immobilized by the engagement of its teeth 182 with the teeth 177 of the backspace bar 176, this motion tends to cam the reproducer carriage 22 backwardly to the left toward its initial position, the relative movement between reproducer carriage 22 and the pawl member 178 being permitted by reason of the slots in the pawl member 178. As the motion of reproducer conditioning lever 124 is continued to its final position, cam 186 on the pawl member 178 slides past cam surface 188 on the reproducer lever 124 and the pawl member 178 is thereby permitted to move away from backspace bar 176 under the influence of spring 184. If it is desired to backspace the reproducer carriage more than the distance it is moved due to a single operation of the backspace mechanism, further movement may be accomplished by repeated operation of the reproducer lever 124 from "neutral" to "reproduce" position.

Inasmuch as the machine herein described is adapted for continuous recording it is desirable that each record carry as much recorded matter as possible, and therefore is arranged to receive a large number of record grooves per inch of record length. For this reason, it is desirable that the backspace mechanism be able to backspace the carriage in very small increments, if the machine is to operate efficiently to repeat only a few words after a single actuation of the backspacing mechanism. Of course, this could be accomplished by increasing the number of teeth on the backspace bar 176, but this would make production more costly due to the necessity of manufacturing such a finely toothed bar. In the present invention, the necessity for a large number of fine teeth in the backspace bar 176 has been eliminated by the provision of a novel arrangement in which the number of teeth per unit length on the backspacing pawl member 178 is made a multiple of the number of teeth per unit length of the backspace bar 176. In the embodiment herein described, double the number of teeth per inch are provided on the pawl member 178 than on the backspace bar 176. With this tooth arrangement, a single operation of the backspacing mechanism backspaces the carriage 22 a distance equal to half the pitch of the teeth on the backspace bar 176.

The manner in which this is accomplished can be more readily understood by referring to Figures 6 and 6a of the drawings. These drawings show how the points x of teeth 177 of backspace bar 176 mesh with the alternate valleys y of teeth 182 of the pawl member 178 during any given operation of the backspacing mechanism to cause the reproducer carriage 22 to be moved in the direction of the arrow an amount equal to one-half the pitch of the teeth of backspace bar 176. Upon a second operation of the backspacing mechanism, the points x of the teeth 177 in the backspace bar 176 next coact with the valleys z of the teeth 182 on the backspace pawl member 178 and move the reproducer carriage 22 back a second distance equal to one-half of the pitch of the teeth 177 on the backspace bar 176 so that, upon a third operation of the backspacing mechanism, the point x of the teeth 177 in the bar 176 will once again coact with valleys y in the teeth 182 on the backspace pawl member 178. With such an arrangement the reproducer carriage 22 can be backspaced a distance equal to any desired fraction of the pitch of a standardized backspace bar 176, merely by providing a number of teeth 182 on the backspace pawl 178 equal to a suitable multiple of the number of teeth 177 provided on the backspace bar 176.

As shown in Figure 1, a switch S—3 is mounted on the base 8 adjacent the reproducer guide bar 136 near the right-hand end thereof. This switch S—3 is provided with a switch operating arm 133 carrying an operating roller 135 which is adapted to contact an extension 137 on the reproducer carriage guide member 132 when the reproducer carriage reaches its most advanced position. As will hereinafter be described, this switch S—3 and a corresponding switch S—4 on machine B are so connected in the machine circuit as to deenergize their respective machine motors M—1 and M—2 when either of the reproducer carriages 22 or 22' reaches its most advanced position, thus preventing jamming of the reproducer feed nut with the reproducer feed screw 46 and also preventing the reproducer stylus 126 from cutting through thin flexible loop record 18.

*Belt handling mechanism*

In the machine herein described a novel and improved arrangement is provided for handling the flexible loop record utilized therewith. A record mounting and dismounting mechanism for handling a record of this type presents several serious problems because a flexible record is not as easily slipped on and off the record support as the older type of rigid wax cylinder. In the improved record mounting-dismounting mechanism herein described, means are not only provided, as described in the above-mentioned copending application Serial No. 366,849, to reduce the axial distance between the mandrels 14 and 16 so as to lessen the tension on the record 18 and facilitate its release from its operative position surrounding the mandrels by permitting relative endwise movement of the loop, but means also are provided for ejecting the loop so that it is automatically and completely removed from the machine, or is moved to a position where so much of the loop projects from the machine as to make complete removal by hand a simple matter.

Referring to Figures 7 and 10, the ejector mechanism is operated by a knob 234 carried by a crank-like handle 236 which is fixedly mounted on a shaft 238, rotatably supported in the vertical frame members 26 and 28 parallel to the guide rod 40, guide rod 42 and mandrels 14 and 16. The left-hand end of ejector shaft 238 is provided with a lever 240 having a hook-like free end 241 engaging the roller 242 rotatively mounted on one end of a lever 244 pivotally secured to frame member 26 by a shoulder screw 246. The other end of lever 244 is connected by pivot screw 248 to a thrust link 250. Thus levers 240 and 244 constitute a toggle connection between ejector shaft 238 and link 250. The free end of thrust lever 250 is slotted at 252 to slidably receive the thrust pin 230 mounted on the upper end of the rockable mandrel supporting lever 204, as mentioned above. A spring 253, connected with the frame 26 and to the lower end of the lever 244, normally holds the toggle 240—244 in the unoperated or broken position shown in Figures 7 and 10. Normally, the ejector structure, including the ejector operating handle 236, is held in this unoperated position, not only by means of the spring 253, but also by the above described spiral record loop tensioning spring 232, which through thrust pin 230 tends to hold the mandrel supporting lever 204 in its extreme left-hand position, as shown in Figures 7 and 10. However, when the ejector handle 236 is rotated in a counterclockwise direction, this mechanism moves from the position shown in Figures 7 and 10 to the operated position shown in Figure 7a tending to straighten the toggles 240—244. Lever 240 then rotates counterclockwise, its hook-like end coacting with the roller 242 to impart a clockwise movement to lever 244. The link 250 moves to the right, rocking mandrel support 204 in a clockwise direction about its shaft 206, against the force of bias spring 232. The idler mandrel shaft 202 and mandrel 16 are thus moved toward driving mandrel 14, reducing the distance therebetween. This lessens the tension on the loop record 18 and loosens it upon the mandrels so that it may be removed therefrom by further operation of the ejector mechanism, as will hereinafter be described.

*Record belt pickup device*

A pickup device is provided for moving the record loop 18 transversely toward the free ends of the mandrels after the axial distance between their shafts has been reduced in the manner just described, either to discharge the record from the machine or to move it to a position where it may be readily and easily removed manually, the ejecting mechanism being left in such a condition that a fresh record may be inserted immediately without further manipulation. Referring to Figures 8, 9, 9a and 10, this pickup device will be seen to be supported on a U-shaped bracket 254, whose sides are turned toward each other at their inner ends to form flanges 256 by means of which the bracket is suitably secured to frame member 26, its sides being disposed one above the other in the space between the mandrels 14 and 16. The rigidity of this bracket 254 is increased by the provision of a cross brace 258, secured to the bracket by screws 260. The bracket 254 slidably supports a record carrying slide frame 262 mounted in the same vertical plane as the bracket 254 adapted to be reciprocated between fixed limits in a path parallel to the axes of the record mandrels 14 and 16. This slide frame comprises upper and lower outer strap members 262a, 262b disposed respectively above and below the upper and lower runs of a record belt 18 mounted on the mandrels, which strap members are connected adjacent the inner or left ends of the mandrels, as shown in Figures 9 and 9a, by means of arcuate portions 265 to similar upper and lower inner strap members 262c, 262d disposed respectively below and above the said upper and lower runs of the belt 18. Members 262c and 262d are connected by an arcuate strap portion 263 positioned adjacent the outer or right ends of the record mandrels. All of the upper and lower strap members lie in planes substantially parallel to the belt runs and are preferably constructed integrally from a single piece of suitable material. It will be readily understood from the above that when a record belt is operatively mounted on the mandrels the runs of the belt will lie respectively in the spaces formed between the inner and outer parallel strap members constituting the upper and lower portions or legs of the slide. The spacing between the upper and lower legs of the slide is maintained by two braces 264, 266 secured to the inner members 262c, 262d, these braces during operation of the slide being guided in longitudinal slots 267 running almost the full length of the upper and lower members of the U-shaped bracket 254, as shown in Figure 10.

This record carrying or pickup frame 262 is adapted to assume two positions; the one, shown in Figure 9, in which it is latched, as will later appear, when a record has been operatively mounted in the machine; and the other, shown in Figure 9a, in which it is resiliently held, after ejection of a record from the mandrels. The outer limit of motion of the ejector slide member 262 with respect to the U-shaped bracket 254 is determined by an arcuate stop member 270 secured across the inner face of the base of the U-shaped bracket 254 so as to limit the movement of the ejector slide 262 when the crossbrace 266 contacts member 270, as shown in Figure 9a, as the ejector is operated to its record-ejected position. This slidable ejector frame 262 is normally biased to this operated or ejection position by means of a wire spring member 268 fastened at one end under the lower brace-securing screw 260 on the U-shaped slide-supporting frame member 254 and provided at its other end with a hook-like portion 269 adapted to slide along the inner edge of the vertical ejector slide brace 266. When the ejector is in its operated position as shown in Figure 9a the spring member 268 is fully extended, but when the ejector is in its unoperated position, as shown in Figure 9, the hook-like end 269 of the spring member 268 slides up on the inner edge of brace 266 so that the spring is compressed into the distorted position, shown in Figure 9.

The ejector slide or pickup member 262 is provided with an arrangement for engaging a loop record to be mounted on or removed from the machine to pick it up and move it with the ejector slide 262 as the slide is selectively moved to its alternate positions shown in Figures 9 and 9a, respectively. Two bell crank hook members 278 are pivotally attached to the ejector-slide brace 266 by shouldered screws 280, and are adapted to be positioned in contact with the outer edges of a loop record 18 to move it into operative position on the mandrels. Each of these bell crank members 278 is provided with an outwardly extending record-engaging hook 282 at the extremity of one arm thereof. The other arms 284 of the bell crank members 278 extend inwardly toward each other. The ends of arms 284 contact the two end portions of a spring member 286 suitably secured at its center to the spacing brace 266, as by a screw 288. This spring 286 tends to rotate the hook portions of the bell crank members 278 toward each other, to the inoperative positions shown in Figure 9a, which positions they assume when the mechanism is operated for ejection of a record loop. To control movement of these record-engaging members 278 toward and away from one another, their inner opposing edges are provided with cam surfaces 290 positioned to coact with the ends of the above-described arcuate stop member 270 to move the hooks 282 apart when the ejector slide 262 is moved from the operated position, shown in Figure 9a, to the unoperated position, shown in Figure 9, by pressure of the hand against the rounded end 263 of the ejector slide, in the direction of the arrow D in Figure 9a. This movement of the bell crank members is permitted by the provision of suitable slots (not shown) in the end portion 263 of the ejector slide 262. In spread position, the hooks 282 bridge the spaces between the inner and outer members of the ejector slide 262 adjacent the outer end of said slide, as shown in Figure 9.

It will be seen then that when a record loop 18 is first placed on the machine surrounding the mandrels, its upper and lower runs will occupy the said slide spaces as the loop is slid over the mandrels to the point where its inner edge contacts the inner end portions 265 of the slide 262, as indicated by the dotted lines 18' in Figure 9a. Inward movement of the ejector slide toward its ejector unoperated position, shown in Figure 9, causes the stop member 270 to spread the crank levers 278 and bring the hook-like extremities 282 into contact with the outer edge of the record 18. During further inward movement of the slide the record loop is carried therewith until the loop is fully seated on the mandrels 14 and 16 in approximate engagement with the flanges 200 and 201 of the mandrels. During this inward movement of the slide 262 the ejector tension spring 268 is bent into the cocked position shown in Figure 9 and the slide spacing brace 264 is moved beyond the latching edge 276 of the latch 272 (see Figure 10), hereinafter to be described, a sufficient distance to insure contact between the inner edge of the loop and the said flanges 200 and 201. When the hand is removed from the rounded end 263 of the slide, the slide springs outwardly a slight distance before the brace 264 engages the latch 272, thus freeing the hooks 282 from contact with the outer edge of the loop, as shown in Figure 9, before the latch operates to lock the slide in its unoperated or ready position. At this time, as will hereinafter be described, a latch holding the mandrel supporting lever 204 in the position shown in Figure 7a is released to permit rotation thereof, counterclockwise, under the influence of spiral spring 232, from the position shown in Figure 7a to the position shown in Figures 7 and 10, to increase the distance between the mandrels 14 and 16 and thus put the loop record 18 under operating tension in its fully seated position.

*Ejector latching mechanism*

To effect the above-mentioned ejector latching and unlatching operations, a latch releasing link 300, shaped substantially as shown in Figures 7, 7a and 10, is pivotally secured to the thrust pin 230 carried by the mandrel supporting lever 204. This link 300 is slidably supported intermediate its ends on a post 302 projecting from vertical frame member 26, by means of a shouldered screw 304 which rides in a horizontal slot 306 in the link 300. A vertical shoulder 308 is provided on the upper edge of link 300. When the ejector mechanism is operated by turning handle 234 to rock the mandrel mounting lever 204 in a clockwise direction, link 300 is moved to the right so that shoulder 308 strikes the edge of the ejector slide retaining latch 272, which is pivoted on a shouldered screw 274 on the underside of the upper leg of the U-shaped slide supporting frame member 254, as shown in Figures 9 and 9a. This latch 272 is provided with a detent 276 which engages the right-hand edge of spacing brace 264 when the ejector slide 262 is in its unoperated ejection position to hold the slide in this position against the force of spring 268. Latch lever 272 is normally held in its latched position by a spring 273 (see Figure 7). When the shoulder 308 of link 300 strikes latch lever 272 upon operation of ejector handle 234, it rotates lever 272 in a clockwise direction against the force of spring 273 to its unlatched position, thus releasing the ejector slide member 262 which then moves to its operated or record ejected position under the force of spring 268. This movement of the slide is timed to take place after the idler mandrel 16 has been moved toward driving mandrel 14, as above described, to remove the tension from the loop record 18 and thus permit ejection thereof.

Referring to Figures 7 and 10, a lever 310 will be seen mounted for rotation in a horizontal plane on a right angle bracket 312 secured to the vertical frame member 26, by means of a pivot screw 314. Adjacent its free end the lever 310 is provided with a downwardly projecting flange 316 and the lever is normally biased away from the vertical frame member 26 by a spring 318 (see Figures 9 and 9a) interposed between vertical frame member 26 and the flange 316. When the ejector mechanism is in record seated position with the link 300 in its most left-hand position as shown in Figure 7, a portion of the lever 310, under the influence of spring 318, presses against the inside of a downwardly projecting portion 320 of the link 300. When the link 300 moves to the right during an ejection operation, its projection 320 moves beyond the end of lever 310, which lever then swings outwardly into the return path of the link 300 under the influence of spring 318 as shown in Figures 7a and 9a. Thus the lever 310 serves as a stop to block the return of link 300 from its effective right-hand position to its ineffective left-hand position, thereby holding mandrel support lever 204 in the belt tension release position, shown in Figure 7a, whereat the distance between the axis of mandrels 14 and 16 is a minimum. After a new record has been placed on the mandrels with its upper and lower runs lying in the space between the straps of ejector slide 262, and the ejector slide 262 is moved toward the left to its record seated position, as shown in Figure 9, a shoulder 321 on the inner edge of the slide brace 264 moves into contact with the downwardly projecting flange 316 on the lever 310 and forces it to the left, as shown in Figure 9a, against the force of spring 318, thus moving the end of the lever 310 out of the return path of link 300 so that lever 204 can rock back to the position shown in Figures 7 and 10, under the influence of the idler mandrel bias spring 232, to tension the loop record element 18 carried upon the mandrels 14 and 16.

From the above it will be seen that when a record is to be ejected, the ejector handle 234 is moved counterclockwise, as shown in Figure 10, to shift idler mandrel 16 towards driving mandrel 14, thus releasing the tension on the loop record 18. By this same action latch 272 is released, permitting rapid movement of the ejector slide structure 262 to the position shown in Figure 9a by tension spring 268. During movement of the ejector slide structure 262 to the right, the hooked members 278 are brought together by the spring 286 when, in the movement of the slide, the stop member 270 traverses the cam surfaces 290 of said hooked members. This action removes the hooked ends 282 from the path of the belt record 18. Thus when the ejector slide has moved sufficiently to engage the inner edge of the record belt, which has been engaging the flanges 200 of the mandrels 14 and 16, the belt is picked up by the inner ends of the belt carrier straps of the slide and is carried outwardly with the slide away from the mandrel flanges. When, at the end of its travel, the ejector slide is suddenly stopped by engagement of the cross brace 266 with the stop member 270, the record 18 is projected a further distance to the right by the momentum it has acquired. Conditional upon resiliency and strength of the spring 268, the belt may be thrown entirely off the mandrels 14 and 16, or be moved to a position slightly beyond the outer end of the ejector slide structure, as shown in Figure 9a, so that it may be easily grasped and removed.

In order to provide a streamlined, funnel-shaped mouth into which a record loop 18 may be inserted when it is being mounted on the machine, the outer strap of the upper leg of the ejector slide 262 is provided with a smoothly curved upturned lip 292, and outer strap of the lower leg of the slide is provided with a flat plate 294, approximately equal in width to the distance across the two mandrels 14 and 16, which plate has an outer lip 296 turned downwardly in a smooth curve. By this means, when a record is properly presented to the machine it is guided to its proper resting place. To further simplify positioning of a record in the machine, the mandrels 14 and 16 are provided with smooth conical ends 17, shaped as shown in Figure 11, so that a loop record is automatically spread to its proper operative form as it is slid over these ends, and over the rounded end 263 of the ejector slide structure 262.

*Safety interlock mechanism*

In order to prevent the recorder control lever 114 and the reproducer control lever 124 from being operated when the record ejection mechanism is in record ejected position, a novel safety interlock mechanism is provided to lock the control levers 114 and 124 in their "neutral" positions when the ejector is operated. This prevents damage to the styli, i. e., to the recorder stylus 98, by striking the bare metal surface of anvil 122, or the reproducer stylus 126 through contact with the bare metal surface of driving mandrel 14. This safety interlock mechanism also is arranged to prevent the operation of the record ejection mechanism when either or both of the styli control levers 114 and 124 are in operative position with stylus 98 and/or stylus 126 in contact with the surface of a loop record 18. Thus, damage to the thin flexible record 18 by transverse motion of the loop record with respect to the styli such as occurs during the ejection operation, is prevented.

Referring to Figure 10 this safety interlock mechanism is indicated generally at 25. Two levers 322 and 324 (see Figures 1 and 2) rotatively mounted at opposite ends of the recorder guide rod 40, support a bail 326 parallel to the guide rod for rocking movement thereabout. As can best be seen in Figure 8, this bail seats in a groove 328 on the upper or rear side of the recorder control lever 114 so that the bail is rocked clockwise about the guide rod 40 when the control lever 114 is moved from its "neutral" to "record" position to move the recorder stylus 98 into contact with the record 18.

It should be noted at this point that the bail 326 not only serves as a component of the safety interlock mechanism, but also to protect the recorder stylus 98 from being damaged by suddenly striking anvil 122, when the springs 102 act to move the recorder stylus against the record, upon actuation of the recorder operating lever 114. To prevent the recording stylus 98 from moving too rapidly, a dash pot structure 330 is provided to slow down motion of the recorder control lever 114 to "operative" position. As shown in Figure 10, the piston portion 332 of the dash pot 330 is pivotally connected to a pin 334 projecting from a second arm 336 forming part of the left-hand bail supporting lever 322. This limits the speed with which the recorder stylus 98 may be moved toward record 18. The dash pot actuating pin 334 also functions to operate a switch S—7 to indicate by electric signal when the recorder control lever 114 is in "record" position. This switch S—7, shown in dotted lines in Figure 7, is mounted on the side of the vertical frame member 24 and is provided with a switch operating lever 335 terminating in a cam-like end 337 which is adapted to contact the pin 334 on arm 336 of bail supporting lever 322. By this means switch S—7 is operated to closed position by the pin 334 when the stylus control lever 114 is moved from its "neutral" to "record" position. As will hereinafter be described, this switch S—7 and a corresponding switch S—8 on machine B are connected in the circuit of the machine as shown in Figure 15 to indicate when the machine is fully conditioned for continuous recording.

Once more referring to Figures 7, 8 and 10, a rockable bail 338 similar to bail 326, is rotatively mounted on two levers 340 and 342 parallel to the reproducer guide rod 42 and rides in a groove 344 formed on the upper side of the reproducer control lever 124. A shiftable cam bar 346, provided with horizontal slots 348 and 350, is slidably mounted for reciprocatory horizontal motion by two shoulder screws 352 and 354 passing through slots 348 and 350 and threaded into a right-angle bracket 356 (see Figure 9) which is secured to a member 358 bridging the tops of the vertical frame members 24 and 26. The ends of this cam bar 346 are provided with inverted U-shaped grooves 360 and 362 which ride on the bails 326 and 338, respectively. When the stylus control levers 114 and 124 are in their "neutral" position as shown in Figure 8, the bails 326 and 338 press against the right-hand walls of these grooves 360 and 362 as shown in Figure 7. Cam bar 346 is normally biased in its extreme left-hand position in which the screws 352 and 354 are pressed against the right-hand ends of slots 348 and 350 by a spring 368, one end of which is secured to a pin 370 connected to the bar 346 and the other end to a pin 372 attached to the bracket 356. When recorder control lever 114 is moved from "neutral" to "record" position, its associated bail 326, which is resting against the right-hand wall of the U-shaped groove 360, pushes the bar 346 to the right against the tension of spring 368. Similarly, when the reproducer control lever 124 is moved from its "neutral" to "reproduce" position, its associated bail 338 presses against the right-hand wall of the groove 362 and correspondingly pushes the bar 346, against the tension of spring 368, to its extreme right-hand position.

The grooves 360 and 362 of the bar 346 are long enough to permit independent operation of the recorder control lever 114 and the reproducer control lever 124, either bail 326 or 338 having a lost motion relation to the cam bar 346 when the bar is moved by the other bail. Thus it will be seen that the bar 346 must be moved from its left-hand to its right-hand position if either the recorder or reproducer is put in operative condition by movement of its respective control lever 114 or 124, and that these control levers will be locked against operation if the bar 346 is held in the "neutral" or extreme left-hand position, shown in Figure 7.

The cam bar 346 is interlocked with the record ejector mechanism to hold the recorder and reproducer in "neutral" position when the ejector mechanism is operated, in the following manner: Referring to Figures 7, 9 and 10, a horizontal lever 374 extending at right angles to bar 346 is pivotally mounted at its center by a pivot screw 376 threaded into a right angle bracket 376 projecting upwardly from the bridging member 358. The lower edge 378 of one end of this lever 374 rides along the functional camming upper edge of the bar 346 and is biased into contact therewith by a spiral tension spring 380, the other end of which is connected to a projection 382 on the bracket 358, as shown in Figure 9. The other end 384 of the lever 374 is pivotally connected at 386 to a depending interceptor arm 388 whose lower end 394 projects through and is guided by a slot 390 in the upper leg of the U-shaped ejector supporting bracket 254. The upper edge of bar 346 is provided with a groove 392 located immediately below the lower edge 378 of lever 374 when bar 346 is in its normal or "neutral" position, as shown in Figure 10. When the lower edge 378 of lever 374 is positioned in the groove 392 and held therein by the action of spring 380, the lower end 394 of the interceptor arm 388 occupies a position just clearing the upper edge of the shoulder 308 of the sliding link 300, as shown in Figures 7 and 10. When the mechanism is in this position, i. e., with the recorder and reproducer both in "neutral" position, the sliding link 300 can slide to its latch-release or record-eject position without interference from the interceptor member 388. However, when either recorder control lever 114 or reproducer control lever 124 is operated to "record" or "reproduce" position, as the case may be, thus sliding bar 346 to its operative or latch-release position, the lower edge 378 of lever 374 rides out of groove 392 up onto the higher portion of the upper edge of bar 346 thus rotating lever 374 in a clockwise direction, with reference to Figure 9, to lower the member 388 and interpose the lower end 394 of said member in the path of movement of the shoulder 308 of sliding latch-releasing link 300, thus preventing movement of said shoulder 308 into contact with the free end of the ejector latch 272. This interposition of the lower end 394 of the interceptor member 388 into the path of the sliding link 300 thus prevents operation of the ejector mechanism when either the recorder or reproducer is in its recording or reproducing position.

This same interlocking mechanism 25 also functions to prevent operation of the recorder and reproducer control levers 114 and 124 when the record ejection mechanism has been operated. Referring to Figures 10 and 7a, it can be seen that when the ejector mechanism has been operated and the ejector sliding link 300 is in its extreme right-hand position, the upper edge of link 300 to the left of shoulder 308 is disposed beneath the end 394 of the interceptor 388. Thus, when an effort is made to operate either of the control levers 114 and 124 and thus move the shift bar 346 to the right, the lower edge 378 of the pivoted lever 374 cannot ride up out of the groove 392 of bar 346 because lever 374 is prevented from rotating clockwise by the lower end 394 of interceptor 388 striking against and being arrested by the upper edge of the sliding link 300, as shown in Figure 7a. Thus, this safety interlock mechanism prevents operation of the ejector when the machine is in recording or reproducing condition, and, further, prevents placing the machine in recording or reproducing condition if the ejector has been operated to record-ejected position.

*Change-over mechanism for continuous sequential operation*

An improved mechanism is provided for automatically operating machines A and B in sequence so as to permit continuous recording for indefinite periods of time. In general, this mechanism functions in a manner similar to mechanism for a like purpose described in the above-mentioned U. S. Patent No. 2,026,398. Assuming that fresh record loops are mounted in both of the machines A and B, that their recorder carriages 20 and 20' are in their initial or left-hand positions, and that the recording operation is commenced; when the recorder carriage 20 of machine A approaches its limit of travel, it actuates a change-over mechanism to start the motor running on machine B and thus commence recording on machine B. For a short interval of time thereafter, both machines simultaneously record the same matter on their respective record blanks thus providing a slight overlap of the recorded matter. The recorder carriage 20 of machine A then continues its travel to its most advanced position, where the change-over mechanism stops the operation of the driving motor of machine A while machine B continues to record. If the fully recorded record on either machine is always replaced with a fresh record and its recording carriage is moved back to its initial position, this overlap and change-over operation will be repeated whenever the recorder carriage of the other machine reaches a properly predetermined advanced position. In the present case sequential operation is accomplished automatically by means of the mechanism shown in skeletonized perspective in Figure 12 and in plan and partial section in Figures 13, 13a and 14. First referring to Figures 2 and 12, a vertical lever 400 is pivoted near its center, on the side of the end frame member 28 by a pivot screw 402 in such a position that its upper end 401 will engage a stop 404, projecting from the body 76 of the recorder carriage 20, slightly in advance of the position which the stop would attain when the carriage reaches the end of its traverse across the record blank 18. The lower end 403 of this lever 400 contacts one end 406 of a horizontal lever 408 pivotally mounted along the under side of the base 6, by a pivot screw 410, to rotate the lever 408 clockwise, referring to Figure 12, or counterclockwise, referring to the bottom view in Figure 13, when carriage stop 404 picks up the upper end 401 of lever 400 and rotates it clockwise, with reference to Figures 2 and 12. Lever 400 is normally biased counterclockwise, as shown in Figures 2 and 12, by a tension spring 412 so that its upper end 401 is normally swung toward the carriage 20. The lower end 403 of lever 400 is also positioned adjacent a roller 414 mounted at the end of an operating lever 416 of a switch S—5, the function of which will be hereinafter described, so that the switch S—5 is operated when the carriage 20 reaches the limit of its advance across the record 18. The other end 418 of the lever 408 contacts the upturned end 420 of the lower member 422 of a laminated control bar, generally indicated at 419, comprising two flat parallel members 422 and 424, as shown in Figures 12, 13, 13a and 14. Similarly machine B is provided with a vertical lever 400' pivoted on a pivot screw 402' to the side of the end vertical frame member 28' so that it is adapted to be rotated in a clockwise direction, referring to Figure 12, when its upper end 401' is contacted by a stop 404' mounted on the body 76' of the recorder carriage 20' of machine B. The lower end 403' of pivoted lever 400' is attached to a spring 412' which normally biases the lever counterclockwise. This lower end 403' of the pivoted lever 400' is adapted to strike an extension 421 which projects perpendicularly from the side of the upper slidable control bar 424, and to press against this projection 421 and thereby move the upper control bar 424 to the left, when the carriage stop 404' strikes the upper end 401' of lever 400' and rotates it as the carriage moves toward the most advanced position of the carriage on the guide bar 40'. Likewise, the lower end 403' of lever 400' is adapted to move past a roller 414' on a switch operating arm 416' connected to a switch S—6 to operate this switch as the carriage 20' reaches its end position.

Referring to Figure 14, the two members 422 and 424 of laminated control bar 419 are slidably mounted on the under side of a horizontal plate 427 secured to the base member 2, by supporting posts 429. These members 422 and 424 are slidably attached to plate 427 by means of shoulder screws 430 and 432 which pass through registering elongated slots 426 and 428 provided in the respective plates and are threaded into the bottom of plate 427. These two parallel control members, under normal operating conditions, move as a single bar 419 because their ends opposite the ends having the projections 420 and 421 are joined by a tension spring 433. The lower bar 422 is provided with a projecting cam portion 434 positioned to cooperate with a roller 438 attached to the switch operating arm 442 of a normally open motor control switch S—1. Similarly the upper slidable bar 424 is provided with a cam-like projection 436 which cooperates with a roller 440 carried by the switch operating arm 444 of a normally open motor control switch S—2. When recorder carriage 20 is manually returned to its initial or left-hand position after operation of the change-over mechanism to the position shown in Figures 12 and 13, the vertical pivoted lever 400 rotates in a counterclockwise direction, as seen in Figure 12, under the influence of the bias spring 412 and its lower end 403 moves out of contact with the end 406 of the horizontal pivoted lever 408. Lever 408, however, will maintain the position shown in Figures 12 and 13. The parallel slidable control bars 422 and 424, acting as a unitary structure 419, also will remain in their extreme right-hand position, as seen in Figure 13, because of the pressure of the roller 438 on the inner or left edge of the cam projection 434, this roller, in effect, acting as a detent to hold these control members in the position to which they have been carried.

The complete operation of this change-over mechanism can best be understood by reference to Figures 13 and 13a. As will hereinafter be described, switches S—1 and S—2 are connected in series, respectively, with motors M—1 and M—2 of machines A and B, respectively. These switches are normally open and are closed to energize their respective motors when the rollers 438 and 440 are moved respectively to the high points of their operating cams 434—436. Assuming that at the start of a recording sequence the carriage 20' of machine B is idle and stands in its initial position at the left-hand end of guide rod 40' and that machine A is in operation with its carriage 20 moving toward the right-hand end of the machine, then when the carriage stop 404 of machine A strikes pivoted lever 400, this lever is gradually moved to the position shown in Figure 12, causing shifting of lever 408 ultimately to move the lower control bar 422 to the right to the position best shown in Figure 13. Since at this time the carriage of machine B stands in its initial position, the other pivoted lever 400' remains in its normal position out of contact with the projection 421 on the upper slidable control bar 424, which has gradually moved with control bar 422 to its extreme right-hand position, moving roller 440 on switch S—2 up to the top of cam 436, thus closing switch S—2 and putting motor M—2 in operation. By the time control bar 422 has reached its right-hand position, roller 438 on switch S—1 has moved down off the top of the cam-like projection 434, thus moving switch operating lever 444 away from switch S—1 to open this switch and thus deenergize motor M—1. This is the condition shown in Figure 13. In this condition, machine B is recording and machine A has come to a stop with its carriage 20 in its extreme right-hand position. The stylus control lever is then moved to "neutral" position, the carriage on machine A is manually moved to its left-hand or initial position, the completely recorded record is ejected, a fresh record placed on the machine, and the recording stylus control lever 114 is again moved to its "record" position.

At this point it should be understood that for a short period of time while the two control levers are sliding to the right, the rollers of both switch levers will ride along the tops of their respective cams 434 and 436, causing the circuits of both motors to be in closed condition. This provides for the slight overlapping of recording mentioned above.

After deenergization of No. 1 motor, recorder carriage 20' of machine B continues to move in a right-hand direction until the stop 404' on the carriage strikes the vertical lever 400'. This causes the lower end 403' of lever 400' to move in a left-hand direction, as seen in Figure 13, into contact with the projection 421 on the upper slidable control bar 424 so that this control bar 424 is moved in a left-hand direction, as seen in Figure 13. Inasmuch as the horizontal pivoted lever 408 is free to rotate because the lower end 403 of the vertical pivoted lever 400 has been moved away from lever 408, the lower slidable control bar 422 will be moved with control bar 424 to the left, its right angle projection 420 contacting the end 418 of control lever 408 and carrying it with it to its left-hand position. As the combined control bars 422 and 424 are gradually moved to the left, with the continued advance of recorder carriage 20', roller 438 rides up on the cam-like projection 434, thus operating switch S—1 to close the circuit to motor M—1, causing the latter to start operating and thus commencing a new recording on machine A.

Machine B will still be recording because roller 440 has not as yet moved off of the top of projection 436. Thus again there will be a short period of time when both machines are recording the same sounds and so providing an overlap between the end of one record and the beginning of another.

As the recorder carriage 20' of machine B moves further toward its end position after roller 438 has moved up to the top of cam projection 434, roller 440 will move off of the top of cam projection 436, thus opening switch S—2 and deenergizing the motor M—2 of machine B, to stop recording on machine B and leaving the recorder carriage of machine B at the end of its path of right-hand travel. If now the recorder carriage 20' of machine B is then moved to its initial or left-hand position and a fully recorded record is replaced by a fresh record blank, then when the carriage of machine A again reaches the end of its travel, the automatic change-over mechanism will repeat the operation just described in the reverse sense, roller 440 first rolling up on cam projection 436 to close switch S—2 to energize motor M—2 and shortly thereafter roller 438 moving off the top of cam projection 434 to open switch S—1 and deenergize motor M—1, thus returning the mechanism to the position in which it is shown in Figure 13. This sequential operation will continue so long as the recorder carriages 20 and 20' are manually reconditioned each time a record is completed.

If, perchance, reconditioning is neglected and the second recorder carriage moves to the end of its travel before the first recorder carriage is returned to its initial position, means are provided for automatically shutting off both machines to prevent jamming of the control mechanism and possible damage to the motors of the machine. This is accomplished by reason of the resilient coupling provided between the relatively movable members of the two-part slidable control bar 419. Assuming the mechanism to be in the position shown in Figure 12, with recorder carriage 20 at its final position, and that recorder carriage 20' then moves to its final position, the stop 404' will, as described above, strike the upper end 401' of the vertical lever 400' and move the lower end 403' of this lever in a left-hand direction to strike the projection 421 on the upper slidable control bar 424. Under these conditions, the lower control bar 422 will be locked in the position shown in Figure 13 because the lower end 403 of vertical pivoted lever 400 is held rigidly against control bar 422 by the carriage 20. Because members 422 and 424 are separate units joined merely by the spring 433, this spring 433 will yield to permit upper member 424 to move to the left to its extreme position, while the lower slidable control bar 422 remains in its right-hand position, as shown in Figure 13a. In this new position of the parts, roller 438 of switch S—1 is positioned off and to the left of cam projection 434, holding switch S—1 in open condition. Cam projection 436 of bar 424 has moved to the left beyond roller 440 of switch S—2 permitting roller 440 to move off and to the right of cam projection 436, to open switch S—2. Thus, under these circumstances, both of the motors will be deenergized and, due to the yielding connection between members 422 and 424, this result is accomplished without injury to any part of either machine unit or to the interconnecting change-over mechanism.

Switches S—5 and S—6 are normally open switches and, as will be described hereinafter, are closed by movement of the respective recorder carriages to terminal position to operate signal lights indicating that the corresponding carriage should be returned to its initial position to receive a fresh record blank and be reconditioned for recording.

*Indication system and electrical connections*

A continuous recording machine of the type herein described is preferably arranged to be controlled from a position remote with respect to the machine itself, and therefore it is desirable that signals be arranged at the remote control station to indicate the condition of the machine. Referring to Figure 15, a remote control station C is connected by a five-wire cable 450 to machines A and B mounted on base 2 (indicated by dotted lines), and in turn the machines A and B are connected by four conductors 452 and two conductors 454 to a recorder amplifier A—1 and a reproducer amplifier A—2, respectively. The remote control station C is provided with three indicator lamps L—1, L—2 and L—3, and a main control switch S—9 for turning the entire machine on or off. The main control switch S—9 connects all of the various circuits of the recording machines A and B with a power supply P.

Indicator lamp L—1 is a "ready" signal. It is connected in series with switches S—7 and S—8 across the power supply P. These switches, as above described, are closed by movement of the recorder control levers 114 and 114' to "record" position. Thus, this "ready" lamp is lighted only when both of the recorders are conditioned for recording so that the entire machine is in proper state for continuous operation.

Indicator lamp L—2 is the "record" lamp which is lighted when either machine A or B is actually recording. This lamp is connected in series with normally closed switches S—3 and S—4 and in parallel with the circuits of both motors M—1 and M—2 so that it is lighted whenever either of the motors is energized, thus indicating that either machine A or machine B is actually in operation.

Indicator lamp L—3 is the "change" indicator lamp. It is connected across the power supply P in series with parallel-interconnected switches S—5 and S—6. When either recorder carriage 20 or recorder carriage 20' reaches the limit of its travel, i. e., its extreme right-hand position, referring to Figure 1, lamp L—3 indicates that it is necessary to change the record on one of the machines if further continuous recording is desired.

As previously described, switches S—1 and S—2 are connected in series respectively with motors M—1 and M—2. In turn these circuits are connected in parallel with each other and in series with switches S—3 and S—4 across the power supply P, as shown in Figure 15. Since switches S—3 and S—4 are normally closed, so long as this condition obtains, either motor M—1 or M—2 will be in operation, whenever main switch S—9 is closed, depending upon the position of the automatic change-over mechanisms. Switches S—3 and S—4 are closed throughout all normal operations of the machine, except when one (or both) of the reproducer carriages 22, 22' has been operated or otherwise moved to the end of its path of travel. When this occurs both motor circuits will be broken and remain open until the offending reproducer carriage (or carriages) has been returned manually toward its initial left-hand position.

In the above referred to Norton Patent 2,026,398, a switching arrangement is disclosed operable by operation of the change-over mechanism selectively to connect the dual recorder units to input sound translation means only when the respective dual motor units of the machine are energized. This function is accomplished in accordance with the present invention by the relay arrangements R—1 and R—2 disclosed in Figure 15. The present switch-over system, in addition, automatically substitutes a condenser load upon the recorder amplifier in place of the load of a recorder unit disconnected from the amplifier by the relay. Also as disclosed herein, the reproducer units of the dual machines are selectively connected for operation by the same relay mechanism, which will now be described.

The windings W and W' of the relays R—1 and R—2 are connected in parallel, respectively, with motors M—1 and M—2 so that they are energized whenever their respective motors are in operation. Relay R—1 is provided with five contacts $a$, $b$, $c$, $d$ and $e$, and relay R—2 with contacts $a'$, $b'$, $c'$, $d'$ and $e'$. Contacts $a$, $b$ and $c$ form a single pole double throw switch and contacts $d$ and $e$ a single pole single throw switch. These contacts are arranged so that when winding W is deenergized, contacts $b$ and $c$ are closed, and contacts $a$ and $b$ and contacts $d$ and $e$ are open, as shown in Figure 15. On the other hand, when motor M—1 of machine A is energized, contacts $b$ and $c$ are opened and contacts $a$ and $b$ and contacts $d$ and $e$ are closed, connecting recorder 19 of machine A through a transformer T—1 to the output of the recorder amplifier A—1, the input of this amplifier being connected to the source of the vibrations to be recorded such as the microphone MK; and the reproducer 21 of machine A is connected to the input of the reproducer amplifier A—2, the output of which is connected to a suitable translating device such as speaker Sp. When machine B is energized and machine A deenergized by operation of the change-over mechanism, with the consequent deenergization of relay R—1 and return of its contacts to the condition shown in Figure 15, recorder 19 of machine A is disconnected from the output of transformer T—1 and a condenser C—1 is connected across the transformer T—1; and reproducer 21 is disconnected from the input of amplifier A—2 through the opening of contacts $d$ and $c$. Simultaneously, through the energization of relay R—2, recorder 19' of machine B is connected to the secondary of a transformer T—2, the primary of which is connected in series with the primary of transformer T—1 across the output of recorder-amplifier A—1; and reproducer 21' of machine B is connected to the input of reproducer-amplifier A—2. Upon a further operation of the sequence mechanism to deenergize machine B and energize machine A, the reverse action takes place, the secondary of transformer T—2 being disconnected from recorder 19' and connected across a second condenser C—2. The substitution of condensers C—1 and C—2 for recorders 19 and 19' provides a substantially constant load across the secondary to transformers T—1 and T—2 when their respective recorder units are disconnected therefrom.

As many possible embodiments may be made of the above invention without departing from the scope thereof, it is to be understood that all matter herein set forth or shown in the accompanying drawings is to be interpreted as illustrative and not in a limiting sense.

We claim:

1. In apparatus for translating sound vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums in cooperative relationship with a translating device to translate vibrations therebetween, adjusting means for decreasing the axial distance between said drums to permit removal of said record element therefrom, biasing means tending to increase the distance between said drums to tension said record element, shifting means adjacent said drums for moving a record element mounted thereon longitudinally of said drums to remove said element therefrom, biasing means normally tending to effect record removal movement of said shifting means, a latch biased to hold said shifting means against record removal movement, and means cooperatively associated with said drum adjusting means and said latch to release said latch from engagement with said shifting means during the operation of said adjusting means.

2. In apparatus for translating sound vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums in cooperative relationship with a translating device to translate vibrations therebetween, adjusting means for decreasing the axial distance between said drums to permit removal of said record element therefrom, biasing means tending to increase the distance between said drums to tension said record element, shifting means adjacent said drums for moving a record element mounted thereon longitudinally of said drums to remove said element therefrom, biasing means normally tending to effect record removal movement of said shifting means, a latch biased to hold said shifting means against record removal movement, means cooperatively associated with said drum adjusting means and said latch to release said latch from engagement with said shifting means during the operation of said adjusting means, a second latch adapted to retain said adjusting device in its operated record removal position, and means on said shifting means for releasing said second latch upon the restoration of said shifting means to its latched unoperated position.

3. In apparatus for translating sound vibrations between a record medium and a vibratable medium having a pair of drums disposed side by side in a substantially horizontal plane, mounting means for rotatably supporting each of said drums one of which is movable toward and away from the other to exert tension or release tension in a flexible loop record element mounted upon said drums, a spring normally tending to move said movable mounting means to separate said drums, adjusting means manually operable to move said mounting means against the action of said spring to decrease the distance between said drums and relieve the tension in said record element, shifting means adapted to move in either direction longitudinally of said drums to mount a record element on said drums or to remove said element from said drums, a spring normally tending to move said shifting means to record removal position, a latch adapted to engage said shifting means to hold it in record mounted position, and means operable in response to said manual operation of said adjusting means to release said latch and permit the record element removal operation of said shifting means.

4. In apparatus for translating sound vibrations between a record medium and a vibratable medium having two rotatable drums for supporting an endless flexible record element to move in a given path, a frame, means to mount one of said drums upon said frame to rotate about a fixed axis, adjustable means to mount the other of said drums upon said frame to rotate about a movable axis substantially parallel to said fixed axis, comprising a plate mounted on the frame substantially perpendicular to said fixed axis having a bearing member whose axis is substantially parallel to said fixed axis, a crank rockably supported by said bearing member, a fixed shaft for rotatably supporting said other drum extending from said crank substantially parallel to said fixed axis, and adjustable means mounting said plate upon said frame to vary the degree of perpendicularity of said plate to said fixed axis, thereby to permit variable adjustment of the degree of parallelism between the axes of said two drums.

5. In apparatus for translating sound vibrations between a record medium and a vibratable medium having two rotatable drums for supporting an endless flexible record element to move in a given path, a frame, means to mount one of said drums upon said frame to rotate about a fixed axis, adjustable means to mount the other of said drums upon said frame to rotate about a movable axis substantially parallel to said fixed axis, comprising a plate mounted on the frame substantially perpendicular to said fixed axis having a bearing member whose axis is substantially parallel to said fixed axis, a crank rockably supported by said bearing member, a fixed shaft for rotatably supporting said other drum extending from said crank substantially parallel to said fixed axis, adjustable means mounting said plate upon said frame to vary the degree of perpendicularity of said plate to said fixed axis, thereby to permit variable adjustment of the degree of parallelism between the axis of said two drums, and means to bias said crank in a direction to tension a record element carried by said drums.

6. In apparatus for translating sound vibrations between a record medium and a vibratable medium having two rotatable drums for supporting an endless flexible record element to move in a given path, a frame, means to mount one of said drums upon said frame to rotate about a fixed axis, adjustable means to mount the other of said drums upon said frame to rotate about a movable axis substantially parallel to said fixed axis, comprising a plate mounted on the frame substantially perpendicular to said fixed axis having a bearing member whose axis is substantially parallel to said fixed axis, a crank rockably supported by said bearing member, a fixed shaft for rotatably supporting said other drum extending from said crank substantially parallel to said fixed axis, adjustable means mounting said plate upon said frame to vary the degree of perpendicularity of said plate to said fixed axis, thereby to permit variable adjustment of the degree of parallelism between the axis of said two drums, means to bias said crank in a direction to tension a record element carried by said drums, and resilient means interposed between said plate and said frame to effect even tension throughout the width of said record element.

SIMON YERKOVICH.
GEO. W. CAMERON.
RALPH H. SHERMAN.